(12) United States Patent
Agarwal et al.

(10) Patent No.: US 7,807,745 B2
(45) Date of Patent: Oct. 5, 2010

(54) MOLDING COMPOSITIONS CONTAINING POLYCARBONATE AND MODIFIED POLYBUTYLENE TEREPHTHALATE (PBT) RANDOM COPOLYMERS DERIVED FROM POLYETHYLENE TEREPHTHALATE (PET)

(75) Inventors: Parminder Agarwal, Evansville, IN (US); Kristen Cohoon, Lutz, FL (US); Shellie Virginia Gasaway, Los Angeles, CA (US); Ganesh Kannan, Evansville, IN (US); Kenneth Frederick Miller, Posey, IN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 569 days.

(21) Appl. No.: 11/626,557

(22) Filed: Jan. 24, 2007

(65) Prior Publication Data
US 2007/0276069 A1 Nov. 29, 2007

Related U.S. Application Data

(60) Provisional application No. 60/763,082, filed on Jan. 27, 2006, provisional application No. 60/820,460, filed on Jul. 26, 2006.

(51) Int. Cl.
C08K 3/10 (2006.01)
(52) U.S. Cl. .................... 524/537; 521/48; 524/500
(58) Field of Classification Search ............... 524/500, 524/537; 521/48
See application file for complete search history.

(56) References Cited

U.S. PATENT DOCUMENTS

| | | | |
|---|---|---|---|
| 2,465,319 A | 3/1949 | Whinfield et al. |
| 2,720,502 A | 10/1955 | Caldwell |
| 2,727,881 A | 12/1955 | Caldwell et al. |
| 2,822,348 A | 2/1958 | Haslam |
| 3,047,539 A | 7/1962 | Pengilly |
| 3,635,895 A | 1/1972 | Kramer |
| 3,671,487 A | 6/1972 | Abolins |
| 3,864,428 A | 2/1975 | Nakamura et al. |
| 3,907,868 A | 9/1975 | Currie et al. |
| 3,953,394 A | 4/1976 | Fox et al. |
| 4,096,156 A | 6/1978 | Freudenberger |
| 4,128,526 A | 12/1978 | Borman |
| 4,154,775 A | 5/1979 | Axelrod |
| 4,200,567 A | 4/1980 | Goldman et al. |
| 4,203,887 A | 5/1980 | Goedde et al. |
| 4,264,487 A | 4/1981 | Fromuth et al. |
| 4,337,192 A | 6/1982 | Campbell |
| 4,598,117 A | 7/1986 | Liu et al. |
| 4,609,680 A | 9/1986 | Fujita et al. |
| 4,657,973 A | 4/1987 | Endo et al. |
| 4,778,855 A | 10/1988 | Boutni et al. |
| 4,857,604 A | 8/1989 | Agarwal |
| 5,266,601 A | 11/1993 | Kyber et al. |
| 5,326,806 A | 7/1994 | Yokoshima et al. |
| 5,413,681 A | 5/1995 | Tustin et al. |
| 5,451,611 A | 9/1995 | Chilukuri et al. |
| 5,559,159 A | 9/1996 | Sublett et al. |
| 5,900,446 A | 5/1999 | Nishihara et al. |
| 5,981,661 A | 11/1999 | Liao et al. |
| 6,162,837 A | 12/2000 | Gerking et al. |
| 6,255,371 B1 | 7/2001 | Schlosser et al. |
| 6,476,158 B1 * | 11/2002 | England et al. ............ 525/466 |
| 6,515,044 B1 | 2/2003 | Idel et al. |
| 6,689,838 B1 | 2/2004 | Fischer et al. |
| 6,706,843 B1 | 3/2004 | Ishihara et al. |
| 6,887,909 B2 | 5/2005 | Kawamura et al. |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 7,498,368 B2 | 3/2009 | Harashina et al. |
| 2002/0012807 A1 | 1/2002 | Kurian et al. |
| 2002/0188073 A1 * | 12/2002 | Uno et al. ................. 525/166 |
| 2004/0059084 A1 | 3/2004 | Hirokane et al. |
| 2007/0244242 A1 | 10/2007 | Agarwal et al. |
| 2007/0275242 A1 | 11/2007 | Gopal et al. |

FOREIGN PATENT DOCUMENTS

| | | |
|---|---|---|
| DE | 10211513 | 10/2002 |
| EP | 0135493 A1 | 3/1985 |
| EP | 0320651 A2 | 6/1989 |
| EP | 0683201 A1 | 11/1995 |
| EP | 0755977 A2 | 1/1997 |

(Continued)

OTHER PUBLICATIONS

JP 04-345655; published Jan. 12, 1992; Flame-Retardant Resin Composition; TEIJIN LTD; English Abstract only; one page.
Hale, et al.; "Compatibilization of PCT/ABS Blends by Methyl Methacrylate-Glycidyl Methacrylate-Ethyl Acrylate Terpolymers"; Polymer; 40; pp. 365-377; (1999).

(Continued)

Primary Examiner—Edward J Cain
(74) Attorney, Agent, or Firm—Cantor Colburn LLP; Diderico van Eyl

(57) ABSTRACT

A molding composition comprising: (a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and (b) from 5 to 90 wt. % of a polycarbonate component; and from at least 1 wt. % of an impact modifier component, wherein the modified polybutylene terephthalate random copolymer, the polycarbonate component, the impact modifier, and optionally at least one additive, have a combined weight % of 100 wt %. The invention also encompasses methods for making the composition and articles made from the composition.

42 Claims, No Drawings

FOREIGN PATENT DOCUMENTS

| | | |
|---|---|---|
| EP | 0846729 A2 | 6/1998 |
| EP | 1437377 A1 | 7/2004 |
| GB | 1500577 | 2/1978 |
| GB | 2048285 A | 12/1980 |
| JP | 2005089572 | 7/1999 |
| JP | 2000256472 | 9/2000 |
| JP | 2000256920 | 9/2000 |
| JP | 2005-89572 | 7/2005 |
| KR | 20010083551 | 9/2001 |
| WO | WO9950332 | 7/1999 |
| WO | WO 03/066704 | 8/2003 |

OTHER PUBLICATIONS

"GE Gives Plastic Bottle Recycling a New Spin"; ChemicalProcessing.com; http://www.chemicalprocessing.com/industrynews/2006/056.html; printed Oct. 14, 2009; 2 pages.

Pawlak et al.; "Characterization of Scrap Poly(ethylene Terephthalate)"; European Polymer Journal; 36; pp. 1875-1884; (2000).

* cited by examiner

US 7,807,745 B2

MOLDING COMPOSITIONS CONTAINING POLYCARBONATE AND MODIFIED POLYBUTYLENE TEREPHTHALATE (PBT) RANDOM COPOLYMERS DERIVED FROM POLYETHYLENE TEREPHTHALATE (PET)

CROSS REFERENCE TO RELATED APPLICATION

This application claims the benefits of U.S. Provisional Patent Application Ser. No. 60/763,082 filed Jan. 27, 2006 and U.S. Provisional Patent Application Ser. No. 60/820,460, filed Jul. 26, 2006, which patent applications are fully incorporated herein by reference.

BACKGROUND OF THE INVENTION

The invention relates to the field of molding compositions.

Polyethylene terephthalate (also referred to as "PET") is a polyester of terephthalic acid and ethylene glycol can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household and consumer products. Generally, PET has many uses in several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET wastes a significant resource that could be used more effectively.

Thermoplastic molding compositions based on polybutylene terephthalate (also referred to as "PBT"), polycarbonates, and impact modifiers are used in various applications. Although useful to many customers, conventional PBT-polycarbonate-impact modifier molding compositions generally cannot be made from recycle sources of PBT due to the lack of availability of large post-consumer or post-industrial PBT. PET, unlike PBT, is made in much larger quantities and is more easily recovered from consumer wastes. If PET (scrap) materials could be converted to PBT and converted into useful molding compositions, then there would exist a valuable way to meet the unmet need to effectively use underutilized scrap PET in PBT thermoplastic molding compositions. If PET (scrap) materials could be converted to PBT and converted into useful molding compositions, then there would be an effective use of post consumer or post-industrial streams. PBT made this way would conserve our non-renewable resources and reduce the formation of greenhouse gases, e.g., $CO_2$.

U.S. Pat. No. 5,451,611 teaches a process for converting waste polyethylene terephthalate to either poly(ethylene-co-butylene terephthalate) or poly butylene terephthalate (PBT) by reaction with 1,4-butanediol. In discussing the prior art, U.S. Pat. No. 5,451,611 indicates that in most of the processes it cites, the undesirable byproduct diethylene glycol is formed which contaminates the final product and has to be removed by purification before the recovered products can be reused again. A principal object of U.S. Pat. No. 5,451,611 was to provide a process for converting polyethylene terephthalate waste directly to another high value polymer without breaking down the polyethylene terephthalate to its constituent monomers or oligomers. The patent discloses numerous examples in which a variety of polymers have a diol incorporated at various amounts. Example 11 shows a PBT polymer being formed with a complete replacement of ethylene glycol with 1,4-butanediol.

U.S. Pat. No. 5,266,601 teaches a process for making "PBT" from PET by reacting PET with 1,4-butane diol. A principal object of U.S. Pat. No. 5,266,601 was to produce PBT containing less than 1.0 wt. % units of ethylene glycol from PET scrap. Another principal objective of U.S. Pat. No. 5,266,601 was to develop a process that facilitates the reduction of THF generated in the process as much as possible to the extent that this PBT is economically competitive with PBT obtained from monomers. U.S. Pat. No. 5,266,601 emphasizes the production of PBT having ethylene glycol groups in an amount that is less than 1 wt. %. In the instances where compositions contain more than 1 wt. %, U.S. Pat. No. 5,266,601 presents these compositions in comparative examples. Such compositions are described as having "yellowish" and "slightly yellowish" colors, respectively.

Japanese laid-open application 2005-89572 teaches a method for producing polybutylene terephthalate by transesterifying bis(2-hydroxyethyl) terephthalate with 1,4-butanediol in the presence of a transesterification reaction catalyst under the pressure of 1-54 kPa at a final temperature ranging from 200-230° C. and then subjecting the reaction product to polycondensation. In one embodiment, the bis(2-hydroxyethyl) terephthalate is obtained by depolymerizing polyethylene terephthalate with excessive ethylene glycol, and purifying the depolymerized product. The patent teaches that transesterifying bis(2-hydroxyethyl) terephthalate with 1,4-butanediol under reduced pressure imparts favorable results.

Unfortunately, such documents do not meet the long felt need of improved use of PET scrap that is ordinarily incinerated or buried in landfills. U.S. Pat. No. 5,451,611, for instance, does not teach effective processes that enable PET to be able to be broken down into its constituent monomers or oligomers—a feature that is sometimes required by commercial considerations. U.S. Pat. No. 5,451,611 does not provide meaningful guidelines for making compositions functionally similar to PBT containing ethylene glycol in amounts other than trace amounts and which exhibit melting temperatures that are higher than those shown in its examples. Similarly, U.S. Pat. No. 5,266,601 does not provide meaningful details about how to make molding compositions containing polycarbonates, other materials such as flame retardants, epoxies, and PBT with a PET residue such as ethylene glycol in any amount, let alone an amount that is more than 1 wt. %. In fact, neither patent discusses if or how the materials they describe can be used in molding compositions containing polycarbonates, impact modifiers and other materials. Japanese laid-open application 2005-89572 is also silent about molding compositions containing polycarbonates, impact modifiers and PBT as well as methods for utilizing PET effectively to make such compositions. Known technology relating to utilizing PET as scrap materials for making PBT-like materials, in other words, does not provide meaningful solutions that solve the long felt need of new processes for better utilizing PET scrap that is ordinarily incinerated or buried in landfills. Known technology does not provide meaningful solutions that solve the long felt need of new thermoplastic compositions containing polycarbonates, impact modifiers and PBT derived from PET and a combination of physical properties that are highly useful and valued by customers.

For the foregoing reasons, there is a need to develop new molding compositions containing polycarbonates and impact modifiers that utilize PBT derived from PET and that have useful performance properties.

For the foregoing reasons, there is a need to develop new molding compositions that reduce the amount of $CO_2$ emissions.

For the foregoing reasons, there is a need to develop new processes for making molding compositions that utilize PBT derived from PET and that have useful performance properties.

BRIEF DESCRIPTION OF THE INVENTION

The invention relates to a molding composition comprising:
(a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and
(b) from 5 to 90 wt. % of a polycarbonate component; and
(c) has from at least 1 wt. % of an impact modifier component, wherein the modified polybutylene terephthalate random copolymer, the polycarbonate component, the impact modifier, and optionally at least one additive, have a combined weight % of 100 wt. %.

In another embodiment, the invention relates to a molding composition comprising:
(a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkaline earth metal salts, phosphorous-containing compounds and anions, sulfur-containing compounds and anions, napthalene dicarboxylic acids, 1,3-propane diol groups, and combinations thereof.
(b) from 5 to 90 wt. % of a polycarbonate component; and
(c) from at least 1 wt. % of an impact modifier component, wherein the modified polybutylene terephthalate random copolymer, the polycarbonate component, the impact modifier, and optionally at least one additive, have a combined weight % of 100 wt. %.

In another embodiment, the invention relates to a composition comprising:
(a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline earth metal salts, alkali salts, phosphorous-containing compounds and anions, sulfur-containing compounds and anions, napthalene dicarboxylic acids, 1,3-propane diol groups, and combinations thereof.

wherein the total monomer content selected from the group consisting of ethylene glycol, isophthalic acid groups, and diethylene glycol groups in an amount ranging from more than 0 and 17 equivalents or less of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer.
(b) from 5 to 90 wt. % of a polycarbonate component; and
(c) from 1 wt. % of an impact modifier component, wherein the
(d) a quencher component in an amount ranging from 0 to 5000 ppm.
(e) a flame retarding component in an amount ranging from 0 to 25 wt %,
(f) from 0 to 25 wt % or a carboxy reactive component,
modified polybutylene terephthalate random copolymer, the polycarbonate component, the impact modifier, and optionally at least one additive, have a combined weight % of 100 wt %; and
wherein the composition has a melt volume rate that is at least 10% higher as compared to a composition made with a polybutylene terephthalate homopolymer, as measured on pellets according to ISO 1133 method at 250° C. and 5 kgf at dwelling time of 240 seconds and a 2.1 mm orifice.

Such compositions can be used for extrusion, molding or thermoforming applications.

In one embodiment, the invention relates to an article molded from the above-mentioned molding composition.

In another embodiment, the invention relates to methods for making and methods for using the molding composition.

In another embodiment, the invention relates to an article extruded from the above mentioned composition.

In another embodiment, the invention relates to an article thermoformed from the above mentioned composition.

These and other features, aspects, and advantages of the present invention will become better understood with reference to the following description and appended claims.

DETAILED DESCRIPTION OF THE INVENTION

The invention is based on the remarkable discovery that it is now possible to make molding compositions, which have useful physical properties, suitable in commercial applications, which contain a modified-PBT component derived from poly (ethylene terephthalate), e.g., used PET soft drink bottles. Unlike conventional molding compositions containing virgin PBT (PBT that is derived from monomers), the modified-PBT component used in the articles contains a polyethylene terephthalate residue, e.g., materials such as ethylene glycol and isophthalic acid groups (components that are not present in "virgin," monomer-based PBT). Advantageously, despite using a PBT that is structurally different from virgin PBT, our compositions and articles made from the compositions exhibit similar performance properties as compositions and articles made from molding compositions containing monomer-based PBT. The invention can provide a valuable way to meet the unmet need to effectively use underutilized scrap PET in PBT thermoplastic molding compositions. The invention can provide an effective use of post consumer or post-industrial streams. Further, the invention can conserve our non-renewable resources and reduce the formation of greenhouse gases, e.g., $CO_2$. Surprisingly, molding compositions containing modified-PBT random copolymers derived from polyethylene terephthalate can exhibit improved flow properties, as compared to molding compositions containing PBT derived from monomers.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector @273 and 295 nanometers and Water 410 refractomer; (iii) Mobile phase: 5% HFIP 95% chloroform; (iv) GPC columns: Polymer Labs PL HFIP gel 250×4.6 mm, (v) Flow rate: 0.3 ml/min; (vi) Injection volume 10 µl; (vii) Polystyrene standards: Polymer Lab's Easical PS-1, 580-7,500,000 Da.

All ASTM tests and data are from the 2003 edition of the Annual Book of ASTM Standards unless otherwise indicated.

For the sake of clarity, the terms terephthalic acid group, isophthalic acid group, butanediol group, ethylene glycol group in formulas have the following meanings. The term "terephthalic acid group" (R') in a composition refers to a divalent 1,4-benzene radical ($-1,4-(C_6H_4)-$) remaining after removal of the carboxylic groups from terephthalic acid-. The term "isophthalic acid group" (R") refers to a divalent 1,3-benzene radical ($-(-1,3-C_6H_4)-$) remaining after removal of the carboxylic groups from isophthalic acid. The "butanediol group" (D) refers to a divalent butylene radical ($-(C_4H_8)-$) remaining after removal of hydroxyl groups from butanediol. The term "ethylene glycol group" (D') refers to a divalent ethylene radical ($-(C_2H_4)-$) remaining after removal of hydroxyl groups from ethylene glycol. With respect to the terms "terephthalic acid group," "isophthalic acid group," "ethylene glycol group," "butane-diol group," and "diethylene glycol group" being used in other contexts, e.g., to indicate the weight % of the group in a composition, the term "isophthalic acid group(s)" means the group having the formula ($-O(CO)C_6H_4(CO)-$), the term "terephthalic acid group(s)" means the group having the formula ($-O(CO)C_6H_4(CO)-$), the term diethylene glycol group means the group having ($-O(C_2H_4)O(C_2H_4)-$), the term "butanediol group(s)" means the group having the formula ($-O(C_4H_8)-$), and the term "ethylene glycol groups(s)" means the group having formula ($-O(C_2H_4)-$).

An embodiment of the invention relates to a molding composition comprising:
(a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and
(b) from 5 to 90 wt. % of a polycarbonate component; and
(c) from at least 1 wt. % of an impact modifier component, wherein the modified polybutylene terephthalate random copolymer, the polycarbonate component, the impact modifier, and optionally at least one additive, have a combined weight % of 100 wt. %.

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the -trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene terepthalate further includes cis isomer of 1,3-cyclohexane dimethanol, 1,4-cyclohexane dimethanol, trans isomer of 1,-3 cyclohexane dimethanol, trans isomer of 1,4 cyclohexane dimethanol and combinations thereof. In another embodiment, the residue includes cis isomer of 1,3-cyclohexane dimethanol, 1,4-cyclohexane dimethanol, trans isomer of 1,-3 cyclohexane dimethanol, trans isomer of 1,4 cyclohexane dimethanol and combinations thereof. And in another embodiment, the residue can be a mixture of ethylene glycol, diethylene glycol, isophthalic acid groups, cis isomer of cyclohexane dimethanol, trans isomer of cyclohexane dimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid groups.

The amount of the ethylene glycol groups, diethylene glycol groups, and the isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole % (0.02 to 2 wt. %). In one embodiment, the PET-derived modified PBT component has an ethylene glycol content that is more than 0.85 wt. %. In another embodiment, compositions made by our process can contain ethylene glycol is present in an amount ranging from 0.1 wt. % to 2 wt. %. The modified PBT component can also contain diethylene glycol in an amount ranging from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butane diol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene terephthalate random copolymer can vary. For instance, mixtures can be in an amount ranging from 1.8 to 2.5 wt. %, or from 0.5 to 2 wt. %, or from 1 to 4 wt. %. The ethylene glycol, diethylene glycol, and cyclohexanedimethanol groups can be individually or in combination present in an amount ranging from 0.1 to 10 mole %, based on 100 mole % of glycol of the molding composition. The isophthalic acid groups can be present in an amount ranging from 0.1 to 10 mole %, based on 100 mole % of diacid/diester in the molding composition.

It has been discovered that when it is desirable to make a polybutylene terephthalate copolymer having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process.

The total ethylene glycol groups, isophthalic acid groups, and diethylene glycol groups can vary, depending on the application and the user's needs. In one embodiment, the composition can have total monomer content selected from the group consisting of ethylene glycol, isophthalic acid groups, and diethylene glycol groups in an amount ranging from more than 0 and less than or equal to 17 equivalents relative to the total of 100 equivalents of diol and 100 equivalents of diacid groups in the modified polybutylene terephtalate random copolymer. Advantageously, such compositions can maintain useful properties, such as heat deflection temperatures that are more than 80° C.

It has also been discovered that the total amount of inorganic residues derived from the polyethylene terephthalate can be present from more than 0 ppm and up to 1000 ppm. Examples of such inorganic residues can be selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can range from 250 to 1000 ppm. In another embodiment, the amounts of inorganic residues can range from 500 to 1000 ppm.

The PET component from which the modified polybutylene terephthalate random copolymer is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexane-dimethanol and ethylene glycol, copolyesters of terephthalic acid with comonomers containing cyclohexanedimethanol and ethylene glycol, polybutylene terephthalate, poly-xylylene terephthalate, polydianol terephthalates, polybutylene terephthalate, polytrimethylene terephthalate, polyester naphthalates, and combinations thereof.

The modified polybutylene terephthalate component derived from polyethylene terephthalate (PET-derived modified PBT component) is (1) is derived from a polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butanediol derived from a cellulosic material.

A modified polybutylene terephthalate random copolymer derived from the polyethylene terephthalate component can be derived from a polyethylene terephthalate component by any method that involves depolymerization of a polyethylene terephthalate component and polymerization of the depolymerized polyethylene terephthalate component with 1,4-butanediol into the modified polybutylene terephthalate random copolymer. For instance, the modified polybutylene terephthalate component derived from the polyethylene terephthalate component can be made by a process that involves depolymerizing a polyethylene terephthalate component selected from the group consisting of polyethylene terephthalate and polyethylene terephthalate copolymers with a 1,4-butanediol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butane diol, ethylene glycol, and combinations thereof; and agitating the molten mixture at subatmospheric pressure and increasing the temperature of the molten mixture to an elevated temperature under conditions sufficient to form a modified random polybutylene terephthalate copolymer containing at least one residue derived from the polyethylene terepthalate component.

Polyester moieties and the 1,4-butanediol are combined in the liquid phase under agitation and the 1,4-butanediol can be continuously refluxed back into the reactor during step (a). The THF and water formed in the stage can be removed by distillation or partial condensation.

The polyethylene terephthalate component and the 1,4-butane diol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butanediol are subjected to is 2 atmospheres, or higher. For higher pressures, the reaction mixtures can be depolymerized at temperatures higher than 230° C.

The temperature at which the polyethylene terephthalate component and the 1,4-butanediol component are combined and reacted is sufficient to promote depolymerization of the polyethylene terephthalate component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the polyethylene terephthalate component and the 1,4-butanediol component are combined generally ranges from 180° C. to 230° C. 1,4-butanediol is generally used in excess amount relative to the polyethylene terephthalate component. In one embodiment, 1,4-butanediol is used in a molar excess amount ranging from 2 to 20.

During the initial stage of the process when the polyethylene terephthalate component and the 1,4-butanediol are combined and react ("step (a)"), the polyethylene terephthalate component and the 1,4-butanediol depolymerize into a molten mixture at a pressure that is at least atmospheric pressure suitable conditions. 1,4-butanediol, ethylene glycol, are generally recirculated, and tetrahydrofuran is distilled during "step(a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butane diol, ethylene glycol, and combinations thereof.

The duration of the step in which polyethylene terephthalate component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to subatmospheric pressure and increasing the temperature of the molten mixture to a temperature ranging from 240° C. to 260° C., and thereby forming the modified polybutylene terephthalate component derived from the polyethylene terephthalate component.

Excess butanediol, ethylene glycol, and tetrahydrofuran (THF) are preferably removed and step (b) is carried out under agitation. The molten mixture, when placed in subatmospheric pressure conditions at a suitable temperature for a sufficiently long time period, polymerizes into a modified polybutylene terephthalate component derived from the polyethylene terephthalate component random copolymer.

Generally, the molten mixture pressure is subjected to a pressure ranging from subatmospheric to less than 1 Torr. In one embodiment, the pressure is reduced to a pressure ranging from 100 to 0.05 Torr in a continuous manner. In another embodiment, the pressure is reduced to a pressure ranging from 10 to 0.1 Torr in a continuous fashion.

Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from polyethylene terephthalate and poly(butylene terephthlate) oligomers, 1,4, butane diol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under subatmospheric conditions is sufficiently high to promote polymerization of the polyethylene terephthalate and poly(butylene terephthlate) oligomers, 1,4, butane diol, and ethylene glycol to the modified polybutylene terephthalate component derived from the polyethylene terephthalate component. Generally, the temperature is at least 230° C. In one embodiment, the temperature ranges from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that is used to facilitate the reaction of the process generally includes a catalyst that facilitates the reaction. The catalyst can be selected from antimony compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

The catalyst component is generally added during the step when the polyethylene terephthalate component initially combines with the 1,4-butanediol. In another embodiment, however, the catalyst component may be added to the molten mixture that forms after the polyethylene terephthalate component and the 1,4-butanediol component are combined.

The process for making the modified polybutylene terephthalate component derived from the polyethylene terephthalate component is preferably carried out under agitative conditions. The term "agitative conditions" or "agitation" refers to subjecting the polyethylene terephthalate component and the 1,4-butanediol or the molten mixture to conditions that involve physically mixing the polyethylene terephthalate component 1,4-butanediol or molten mixture under conditions that promote the depolymerization of the PET when the agitative conditions are applied to polyethylene terephthalate component 1,4-butanediol "step (a)", or the polymerization of the PBT from polyethylene terephthalate oligomers, 1,4-butanediol, and ethylene glycol "step (b)." The physical mixing can be accomplished by any suitable way. In one embodiment, a mixer containing rotating shaft and blades that are perpendicular to the shaft can be used.

The process for making the modified polybutylene terephthalate component derived from the polyethylene terephthalate component can include a step that reduces the amount of THF produced during the process by adding a basic compound containing an alkali metal to the reactor in step (a) and thereby reducing formation of THF.

The basic compound contains an alkali metal and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminium bicarbonates, and combinations thereof.

The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more.

In another embodiment, a difunctional epoxy compound can be added to reduce the formation of THF. The epoxy compounds may be selected from the group of difunctional epoxies. Examples of suitable difunctional epoxy compounds include and are not limited to difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate. The amount of the epoxy that may be added to the mixture is generally at least 0.05 wt. %. In one embodiment, the amount of the epoxy compound is from 0.1 to 1 wt. %. In another embodiment, the amount of the epoxy compound was 0.2 to 0.5 wt. %.

In one embodiment, the invention provides an additional embodiment in which THF production is reduced by a process that involves the steps of:

(a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof, wherein the polyethylene terephthalate component and the diol component are combined under agitation;

(b) adding 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified random polybutylene terephthalate copolymer containing at least one residue derived from the polyethylene terepthalate component.

This three step embodiment provides an additional advantageous way for producing modified PBT random copolymers from PET. The diol component used in step (a) of the three step embodiment can be selected from ethylene glycol, propylene glycol, and combinations thereof. The diol component can be present in step (a) at a molar amount that is at least half the amount of ethylene glycol moieties present in the polyethylene terephthalate component. The depolymerization of the polyethylene terephthalate component can be carried out for various times. In one embodiment, the depolymerization is carried out for at least 25 minutes.

The 1,4-butanediol used during step (b) of the three step embodiment can be added at a molar amount that is in excess relative to the molar amount of butanediol moieties incorporated into the modified polybutylene terephthalate random copolymer component obtained in step (c).

During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure ranging from 300 to 1500 mbar absolute. In another embodiment, 1,4-butanediol is used in a molar excess amount ranging from 1.1 to 5.

Step(c) of the three step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. The three step process can be carried out in the same reactor. Alternatively, the three step process can be carried out in at least two reactors.

In another embodiment, the three step process can include the step of adding a basic compound during step (a), step (b), step (c), and combinations thereof, and thereby further reduce THF production. The basic compound, as in the two step embodiment, can contain those compounds mentioned above. Alternatively, difunctional epoxy compounds can be added during step (b) in the amounts indicated above.

Advantageously the three step process can reduce tetrahydrofuran by an amount that is at least 30% as compared to the amount of tetrahydrofuran produced by a process that depolymerizes polyethylene terephthalate component with 1,4-butanediol instead of the diol component selected from the group consisting of ethylene glycol, propylene glycol, and combinations thereof.

The process for making the modified polybutylene terephthalate component derived from the polyethylene terephthalate component may contain an additional step in which the PBT formed from the molten mixture is subjected to solid-state polymerization. Solid-state polymerization generally involves subjecting the PBT formed from the molten mixture to an inert atmosphere or subatmospheric pressure and heating to a temperature for a sufficient period of time to build the molecular weight of the PBT. Generally, the temperature to which the PBT is heated is below the melting point of the PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

Our invention includes an embodiment in which the 1,4-butanediol used to make the modified polybutylene terephthalate random copolymer can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Another process that describes converting succinic acid into 1,4-butane diol is described in Life Cycles Engineering Guidelines, by Smith et al., as described in EPA publication EPA/600/R-1/101 (2001). When this embodiment is used, the manufacture of compositions containing the modified polybutylene terephthalate can further reduce $CO_2$ emissions that are ordinary generated when PBT is made from fossil fuel derived monomers. Also, this further reduces the amount of non-renewable hydrocarbon sources that are used in order to make the PBT. The amount of the PET-derived modified PBT component in a molding composition varies with the specific application. Generally, the amount of the PET-derived modified PBT component in a molding composition of the invention ranges from to 5 to 90 wt. %. In another embodiment, the amount of the PET-derived modified PBT component is present ranges from 10 to 50 wt. %.

The thermoplastic composition includes a polycarbonate component. As used herein, the terms "polycarbonate" and "polycarbonate resin" mean compositions having repeating structural carbonate units of the formula (1):

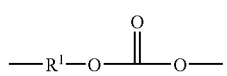

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2-$$  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

As used herein, the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond."

Polycarbonates may be produced by the interfacial reaction of dihydroxy compounds having the formula HO—$R^1$—OH, which includes dihydroxy compounds of formula (3)

$$HO-A^1-Y-A^2-OH \tag{3}$$

wherein $Y^1$, $A^1$ and $A^2$ are as described above. Also included are bisphenol compounds of general formula (4):

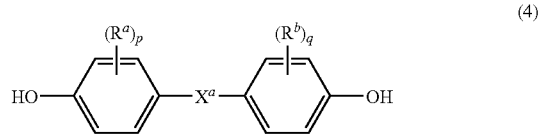

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

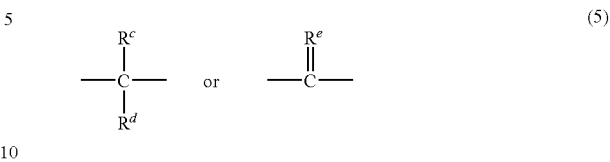

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromo-phenyl) propane, 1,1-bis (hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl) propane, 1,1-bis(4-hydroxyphenyl)n-butane, 2,2-bis(4-hydroxy-1-methylphenyl) propane, 1,1-bis(4-hydroxy-t-butylphenyl)propane, 3,3-bis (4-hydroxyphenyl) phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of 0.05 to 2.0 wt. % of the polycarbonate. All types of polycarbonate end groups are contemplated as being useful in the polycarbonate, provided that such end groups do not significantly affect desired properties of the thermoplastic compositions.

In a specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

"Polycarbonates" and "polycarbonate resin" as used herein may include copolymers comprising carbonate chain units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. Polyester-polycarbonates contain, in addition to recurring carbonate chain units of the formula (1), repeating units of formula (6):

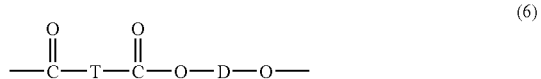

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester-polycarbonates comprise carbonate units as described hereinabove. Carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the weight ratio of polycarbonate to polyester-polycarbonate in the blend can be, respectively, 1:99 to 99:1, specifically 10:90 to 90:10.

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates may be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In addition to the polycarbonates, polyester-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

The polycarbonate may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

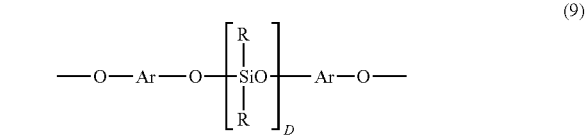

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl) ethane, 2,2-bis(4-hydroxyphenyl)propane, 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (9) may be derived from the corresponding dihydroxy compound of formula (10):

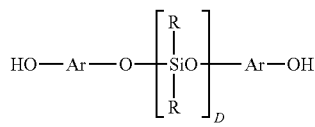

(10)

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (11):

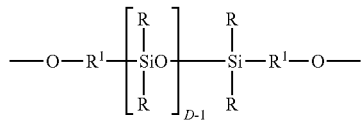

(11)

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

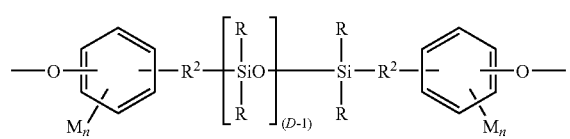

(12)

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

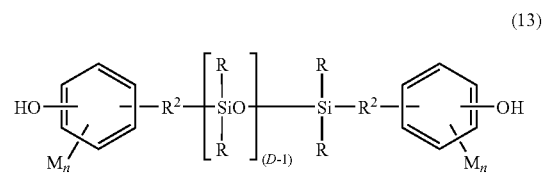

(13)

wherein R, D, M, $R^2$, and n are as described above. Such dihydroxy polysiloxanes can be made by effecting a platinum catalyzed addition between a siloxane hydride of formula (14):

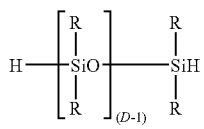

(14)

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt. % of carbonate units and 1 to 50 wt. % siloxane units. Within this range, the polysiloxane-polycarbonate copolymer may comprise 70 to 98 wt. %, specifically 75 to 97 wt. % of carbonate units and 2 to 30 wt. %, specifically 3 to 25 wt. % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property.

The amount of the polycarbonate component varies with the specific application. Generally, the amount of the polycarbonate component is present in an amount ranging from 5 to 90 wt. %. In another embodiment, the amount of polycarbonate present in the composition ranges from to 20 to 70 wt. %.

In another embodiment, a composition and an article made with a composition that further includes a quencher. The quencher component of the molding composition generally includes a variety of quenchers. Suitable quenchers include a solution of 45% phosphorous acid in water that is added as a catalyst quencher to prevent the transesterification of polycarbonate and the polyesters. Other examples of quenchers include phosphoric acid, transition metal phosphates, and other non-acidic species. Specific examples of quenchers include zinc phosphate, monozinc phosphate, calcium phosphate, phosphoric acid, phosphorous acid, and combinations thereof. The effective quantities of quenching agents are well known in the literature. An effective amount will ordinarily be from 50 to 500 ppm, or more. In one embodiment an effective amount ranges from 1 to 5000 ppm. Quenchers will be particularly useful in compositions containing the modified polybutylene terephthalate random copolymer, a polycarbonate component, and an impact modifier.

The impact modifier component is generally a rubbery material, which when used in suitable amounts, imparts energy absorbing properties to the composition. Suitable rubbery impact modifiers include (a) methacrylate butadiene styrene rubbers, (b) acrylate rubbers, (c) acrylonitrile-styrene-acrylate rubbers, (d) high rubber graft acrylonitrile-butadiene-styrenes, (e) acrylate-olefin copolymers, (f) polyolefin modifiers, or (g) silicone-acrylic modifiers (e.g., METABLEN™ S made by Mitsubishi Rayon). In one embodiment, the impact modifier is selected from the group consisting of methacrylate butadiene styrene rubbers, acrylate rubbers, acrylonitrile-styrene-acrylate rubbers, high rubber graft acrylonitrile-butadiene-styrene, silicone-acrylic modifiers, and combinations thereof.

More particularly, the impact modifier can include an acrylonitrile-butadiene-styrene (ABS) polymer of the high rubber graft impact modifier. Rubber modified monovinylidene aromatic resins comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers.

Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof. Higher levels of rubber are preferred.

Especially preferred are acrylonitrile-butadiene-styrene copolymers having greater than 30% by weight rubbery polymeric substrate, preferable greater than about 45% by weight rubbery polymeric substrate. The most preferred rubbery substances comprise polybutadiene or styrene-butadiene copolymer. Also preferred are high rubber graft acrolonitrile-butadiene-styrene copolymer. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, under the trademark BLENDEX® resin grade 336 or 338. One preferred high rubber graft is CYCOLAC® C874202 resin of General Electric Company, Advanced Materials. A process for producing graft copolymer resins is set forth in U.S. Pat. No. 6,384,129 to Lowry entitled Semibatch Emulsion Process for Making Diene Rubber Latex, Rubber Latex Made Thereby, and Graft Copolymer Made Therefrom.

Other typical impact modifiers are the following materials, or blends of two or more of these materials: (1) Paraloid EXL3300, which is Butylacrylate-Methacrylate core-shell rubber; (2) ASA-HRG, which is Acrylonitrile-Styrene-ButylAcrylate copolymer; (3) AES, which is Acrylonitrile-Styrene-EPDM copolymer, where EPDM is ethylene-propylene non conjugated diene elastomer; (4) Lotader AX8900, which is Ethylene-Methacrylate-Glycidylmethacrylate copolymer with Methacylate content of around 8%. The content of impact modifier is preferable less than 40% by weight, more preferable less than 30 percent, and most preferable less than 20 percent.

Core-shell copolymers, method of making core-shell copolymers and the use of core-shell copolymers as impact modifiers in combination with polycarbonate are described in U.S. Pat. Nos. 3,864,428 and 4,264,487. Suitable core-shell copolymers are those that include a rubbery "core" that has a glass transition temperature ("Tg") below about 10° C. and that comprises repeating units derived from one or more monoethylenically unsaturated monomers such as, e.g. acylate monomers, e.g. butyl acylate, and conjugated diene monomers, e.g., butadiene and a rigid "shell" that has a Tg of greater than or equal to about 10° C. and that has repeating units derived from a monoethylenically unsaturated monomer.

The amount of the impact modifier is generally at least 1 wt. %. In one embodiment, the amount of the impact modifier ranges from 1 wt. % to 50 wt. %. In another embodiment, the amount of the impact modifier ranges from 5 to 25 wt. %.

In one embodiment, in addition to containing the PET-derived PBT component, a molding composition can further include other polyesters. Such suitable polyesters can include those comprising structural units of the following formula:

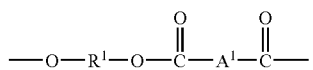

where each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2-6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

U.S. Pat. Nos. 2,465,319; 2,720,502; 2,727,881; 2,822, 348; 3,047,539; 3,671,487 3,953,394; and 4,128,526. Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4-1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof. Particularly suitable polyesters are poly(ethylene terephthalate) ("PET"), and poly(1,4-butylene terephthalate), ("PBT"), poly(ethylene naphthanoate) ("PEN"), poly(butylene naphthanoate), ("PBN"), poly(cyclohexanedimethylene terephthalate) ("PCT"), cyclohexanedimethanol modified poly(ethylene terephthalate also known as polycyclohexylenedimethylene ethylene terephthalate) ("PETG" and "PCTG"), and (polypropylene terephthalate) ("PPT"), and mixtures thereof.

The amount of the additional polyester component that is not the PET-derived PBT, in one embodiment, is generally at least 1 wt %. In one embodiment, the amount of the additional polyester component that is not the PET-derived PBT ranges from 5 wt. % to 90 wt. %.

Our compositions can further include additives, e.g., additives selected from the group consisting of flame retardants, stabilizers, quenchers, mold release agents, polytetrafluoroethylene, polytetrafluoroethylene-poly(styrene-co-acrylonitrile) mixtures, and combinations thereof. More particularly, a molding composition of the invention may further contain a UV modifier. Suitable UV modifiers generally include a wide variety of UV absorbers. Examples of UV absorbers include, but are not limited to, salicylic acid UV absorbers, benzophenone UV absorbers, benzotriazole UV absorbers, cyanoacrylate UV absorbers and mixtures thereof A molding composition of the invention may further contain a heat stabilizer. Suitable heat stabilizers include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid.

In one embodiment, the composition contains a flame retarding component.

The flame-retarding component can be added the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphene, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octa molybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy) ethane, tetrabromobiphenyl ether, hexabromocyclododecane, tribromophenol, bis(tribromophenoxy)ethane tetrabromobisphenol A polycarbonate oligomers, tetrabromobisphenol A epoxy oligomers. Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame-retarding component can include phosphoros-containing compounds. Examples of suitable phosphorous flame retardants include red phosphorus, ammonium polyphosphate. Organophoshoros flame retardants can include halogenated phosphates, non-halogenated compounds. Examples of such materials include tris(1-chloro-2-propyl) phosphate, tris(2-chloroethyl)phosphate, tris(2,3-dibromopropyl)phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines.

Specific structures of phosphorous-containing compounds are discussed below:

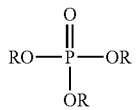

phosphate, where R can be selected from the group of alkyl, aryl, aralkyl, cyclohexyl, isopropyl, isobutyl, and the like.

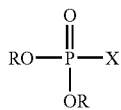

phosphonate, where X is H, and R, where R can be selected from the group of alkyl, aryl, aralkyl, cyclohexyl, isopropyl, isobutyl, and the like.

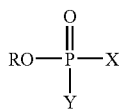

phosphinate, where X and Y=H, and R, where R can be selected from the group of alkyl, aryl, aralkyl, cyclohexyl, isopropyl, isobutyl, and the like, OH, amino functionalized compounds.

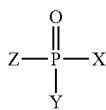

phosphine oxide, where X, Y, Z=H and R, where R can be selected from the group of alkyl, aryl, aralkyl, cyclohexyl, isopropyl, isobutyl, and the like.

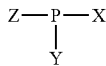

phosphine, where x, y, and z can be selected from the group of H, alkyl, aryl, aralkyl, and the like.

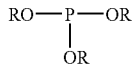

phosphite, where R can be selected from the group of alkyl, aryl, aralkyl, cyclohexyl, isopropyl, isobutyl, and the like, and H.

As such, suitable flame-retarding that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P{=}O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

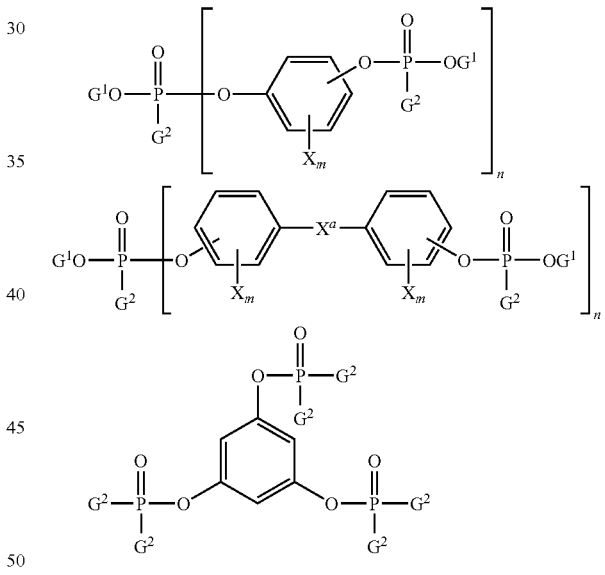

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis (diphenyl) phosphate of hydroquinone and the bis(diphenyl) phosphate of bisphenol-A, respectively, their oligomeric and polymeric counterparts, and the like.

Exemplary suitable flame-retarding compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula

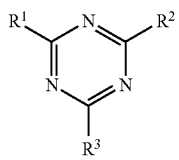

wherein R1, R2, and R3 are independently C1-C12 alkyl, C1-C12 alkoxyl, C6-C12 aryl, amino, C1-C12 alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). The phosphinates have the formula (I)

and/or formula II

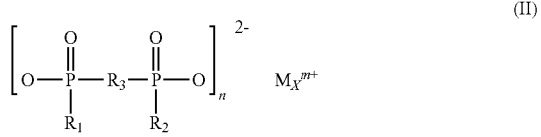

and or polymers comprising such formula I or II, where R1 and R2 are identical or different and are H, C1-C6-alkyl, linear or branched, and/or aryl; R3 is C1-C10, alkylene, linear or branched, C6-C10-arylene, -alkylarylene or -arylalkylene; M is any metal, but suitable are magnesium, calcium, aluminum or zinc, m is 1, 2 or 3; n is 1, 2 or 3; x is 1 or 2.

In one embodiment, R1 and R2 can be H, in addition to the substituents referred to set forth. This results in a hypophosphite, a subset of phosphinate, such as Calcium hypophosphite, aluminum hypophosphite and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame-retarding thermoplastics.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt. %. In another embodiment, the amount of the flame retarding component ranges from 1 to 30 wt %, or from 10 to 20 wt. %.

In one embodiment, the composition of the invention further includes a carboxy reactive material. The carboxy-reactive material is a monofunctional or a polyfunctional carboxy-reactive material that can be either polymeric or non-polymeric. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in swell-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the tradenames Epon 826, 828, and 871; from Ciba-Giegy Corporation under the tradenames CY-182 and CY-183; and from Dow Chemical Co. under the tradename ERL-4221 and ERL-4299. As set forth in the Examples, Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

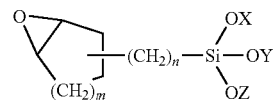

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl)ethyltriethoxysilane, available under the trade name CoatOSil 1770 from GE. Other examples are β-(3,4-epoxy-cyclohexyl)ethyltrimethoxysilane, available under the trade name Silquest A-186 from GE, and 3-glycidoxypropyltri-ethoxysilane, available under the trade name Silquest Y-15589 from GE.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art may determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 weight percent (wt. %) based on the weight of the total composition. In one embodiment, the amount of the carboxy-reactive material is 0.01 to 20 wt. %. In one embodiment, the amount of the carboxy-reactive material is 0.01 to 30 wt. %, or more.

In another embodiment, in addition to containing the PET-derived modified PBT component, a molding composition can further include mold-release agents. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned. The mold release agent can be used in conjunction with other additives, e.g., teflon styrene acrylonitrile.

The amount of the mold release agent can be in the molding composition is generally at least 0.1 wt. %. In one embodiment, the amount of the mold release agent ranges from 0.1 to 2 wt. %. In another embodiment, the amount of the mold release agent ranges from 0.5 to 1 wt. %.

In another embodiment, the composition can further contain organic or inorganic additives. Examples of such materials include and are not limited to stearic acid, acetic acid, adipic acid, benzoic acid, metal salts of the foregoing, antimony oxide, talcs, e.g., ULTRATALC™ additives, and combinations thereof.

The composition can further include a material capable of increasing the heat deflection temperature of the composition by at least from 1 to 10 C, or more. Such materials can include inorganic and organic materials that function as nucleating agents and help increase the heat deflection temperature (HDT) when used in small amounts, e.g., 1 wt % or less. Such a material can be selected from the group of talcs having fine particles, nanoparticles, polytetrafluoroethylene clays, mica, and its blends with other polymers, and combinations thereof, as well as other materials capable of functioning as nucleating agents. The ranges of such materials can vary from 0.01 to 1 wt. %. In a particularly suitable embodiment, the range of such materials can range from 0.1 to 0.5 wt. %. A molding composition of the invention is generally made by combining suitable amounts of the polycarbonate component, the PET-derived PBT component, the polycarbonate, the impact modifier in an extruder (or a functionally equivalent compounding device), and any other additive, under suitable conditions. The polycarbonate component, the PET-derived modified PBT component, the impact modifier (and any additional components) may be compounded simultaneously, separately, or in combinations containing two or three of the components. The extrusion process can include one or more passes through an extruder.

Our invention includes methods for making compositions and articles. Our invention, for instance, includes a method of forming a composition comprising melt blending the components of any of our compositions. The method can include shaping, extruding, or molding the melt blended composition. Methods can include molding a melt blended composition into suitable articles. Our invention can also include a method of making thermoformed articles, which involves thermoforming any of our compositions by thermoforming the components of the composition. And our compositions include articles derived from any of our compositions.

The molding compositions of the invention impart physical properties that are useful in various applications. For instance, the impact resistance properties imparted (as measured by notched izod at room temperature) by the molding composition of the invention is generally at least 5 lbf/in (250 joules/m) at room temperature. In one embodiment, the impact resistance imparted by the molding composition ranges from 250 to 1000 joules/m. In another embodiment, the impact resistance imparted by the molding composition ranges from 750 to 1000 joules/m. The melt volume rate (at 250° C. and 5 kgf) is generally ranges from 5 to 20 cc/10 minutes (min). In another embodiment, the melt volume rate is 12.6 cc/10 min. The tensile modulus of elasticity (MPa) of a molding composition is generally at least 1000 MPa. In another embodiment, the tensile modulus of elasticity of the molding composition ranges from 1000 MPa to 4,000 MPa. In another embodiment, the tensile modulus of elasticity ranges from 2200 to 2270 MPa. The tensile elongation @yield (%) of a molding composition is generally at least 2%. In another embodiment, the tensile elongation @yield (%) ranges from 2% to 20%. In one embodiment, the tensile elongation @yield (%) ranges from 4.4 to 4.5%. The tensile elongation @break (%) imparted by a molding composition is generally at least 50%. In another embodiment, the tensile elongation @break (%) ranges from 50% to 350%. In one embodiment, the tensile elongation @break (%) ranges from 110 to 140%. The tensile stress @ yield (MPa) imparted by a molding composition is generally at least 30 MPa. In another embodiment, the tensile stress @ yield (MPa) ranges from 30 MPa to 100 Mpa. In one embodiment, the tensile stress @ yield (MPa) ranges from 46.8 to 47.5 MPa.

The tensile stress @ break (MPa) imparted by a molding composition is generally at least 30 MPa. In another embodiment, the tensile stress @ break (MPa) ranges from 30 to 100 Mpa. In one embodiment, the tensile stress @ break (MPa) ranges from 43.5 to 47.5 MPa. The flexural modulus (MPa) imparted by a molding composition is generally at least 1000 MPa. In one embodiment, the flexural modulus (MPa) ranges from 1000 to 4000 MPa. In another embodiment, the flexural modulus (MPa) ranges from 2020 to 2050 MPa. The flexural stress @ yield (MPa) imparted by a molding composition is generally at least 40 MPa. In another embodiment, the flexural stress @ yield (MPa) ranges from 40 to 150 MPa. In one embodiment, the flexural stress @ yield (MPa) is 75 to 85 MPa.

The notched izod (J/m) imparted by a molding composition is generally at least 250 J/m. In one embodiment, the notched izod (J/m) ranges from 250 to 1500 J/m. In another embodiment, the notched izod (J/m) ranges from 700 to 780 J/m.

The heat deflection temperature at 1.82 MPa for 3.2 mm bars imparted by a molding composition is generally at least 50° C. The heat deflection temperature that is at least 80° C. can be determined by ASTM D648 at 0.455 MPa. In another embodiment, the heat deflection temperature ranges from 50° C. to 200° C. In one embodiment, the heat deflection temperature ranges from 81.7 to 84.3° C. The mold shrinkage imparted by a molding composition is generally lesser than 5%. In one embodiment, the mold shrinkage ranges from 0 to 5%. In another embodiment, the mold shrinkage ranges from 0.97 to 1.1%.

Advantageously, our compositions can exhibit melt volume rates (MVR) that are highly useful for many applications. In one embodiment, the composition has a melt volume rate that is at least 10% higher as compared to a composition made with a polybutylene terephthalate homopolymer (monomer-derived PBT), as measured on pellets according to ISO 1133 method at 250° C. and 5 kgf at dwelling time of 240 seconds and a 2.1 mm orifice. The melt volume rate can be from 10% to 80% higher, as compared to a composition made with monomer-derived PBT instead of the PBT random copolymers, as measured on pellets according to ISO 1133 method at 250° C. and 5 kgf at dwelling time of 240 seconds and a 2.1 mm orifice.

As such, in one embodiment, the invention also relates to a molding composition including:

(a) a first polyester component comprising a PET-derived random modified PBT copolymer containing one or more of the following groups:

invention increases demand for the use of PET and thereby reduces the need to dispose PET scrap in landfills or by incineration.

Further, the process for making the PET-derived random, modified PBT copolymers used in our compositions can advantageously substantially reduce carbon dioxide emissions and solid waste. Since the PET-derived polyester random modified PBT copolymers made by the inventive process are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is not used, rather a PET component, e.g., polyester scrap, is replaced. The process to make DMT or TPA from crude oil is highly energy intensive and as a result, substantial emissions of CO2 to the atmosphere occur from burning of non-renewable energy sources. By not using DMT or TPA to make the PET derived PBT, carbon dioxide emissions savings are obtained. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of BDO is from biomass derived, feedstocks such as succinic acid, the carbon dioxide savings are further increased for two reasons. Bio derived succinic acid is made form sugars or other bio derived hydrocarbons that are the derived from atmospheric carbon versus

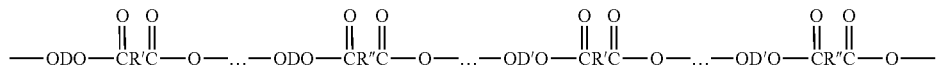

wherein R' is a terephthalic acid group (1,4-C6H4), R" is an isophthalic acid group (1,3-C6H4), D is a butanediol group (—C4H8-), and D' is an ethylene glycol group (—C2H4); such that the polymeric backbone contains isophthalic acid ranging from 1 or to 2 to 10 mole % (0.07 to 7 or 7.50 wt. %) and ethylene glycol in an amount ranging from 0.1 to 2 or 10 mole % mole % (0.13 to 1.3 or 2.1 wt. %);

(b) a polycarbonate component;

(c) a second polyester component different from the polyester component containing the PET-derived modified PBT;

(d) an impact modifier component, and (e) optionally, a quencher component.

The PET-derived modified PBT component can also contain diethylene glycol groups in the amounts discussed above.

The invention provides previously unavailable advantages. For instance, the invention provides molding compositions that function comparably with those based on PBT, despite using a structurally different material containing isophthalic groups and ethylene glycol groups. Since the molding compositions do not require the conventionally prepared PBT, the fossil fuel carbon sources, thus reducing the environmental impact of the polymer derived from BDO based on succinic acid from biomass sources. Furthermore, the fermentation to yield succinic acid requires carbon dioxide as an input thus leading to further carbon dioxide reductions.

Advantageously, a molding composition containing the modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil. To determine the ranges of the reduced $CO_2$ emissions index for our compositions (which have the modified PBT random copolymers present in an amount ranging from 5 to 90 wt. %), the $CO_2$ reduction index can be calculated by multiplying the lower amount of the polybutylene butylene terephthalate present in the composition, in percentage terms, with 1.3 (0.05×1.3=0.065) and the higher amount of the polybutylene terephthalate times 2.5. (0.90×2.5=2.25).

These results can be derived and verified by using material and energy balance calculations (calculations that are well known in the chemical engineering art) and comparing the amount of energy used to make modified PBT random copolymers from PET and the amount of energy used to make PBT from terephthalic acid.

The invention is further described in the following illustrative examples in which all parts and percentages are by weight unless otherwise indicated.

EXAMPLES

Examples 1-16

Overview

The following discusses the materials, preparation procedures and testing procedures used in Examples 1-16.

Materials

The following table gives a list of the ingredients used in the examples.

| Abbreviation | Description |
| --- | --- |
| PET Derived PBT (0.66 iv) | Poly(1,4-butylene terephthalate) derived from PET, intrinsic viscosity of 0.66 dl/g as measured in a 60:40 wt. % phenol/tetrachloroethane mixture at 25° C. |
| PET Derived PBT (1.0 iv) | Poly(1,4-butylene terephthalate) derived from PET, intrinsic viscosity of 0.66 dl/g as measured in a 60:40 wt. % phenol/tetrachloroethane mixture at 25° C. |
| PET Derived PBT (1.2 iv) | Poly(1,4-butylene terephthalate) derived from PET, intrinsic viscosity of 0.66 dl/g as measured in a 60:40 wt. % phenol/tetrachloroethane mixture at 25° C. |
| GE PBT 195 (0.66 iv) | Poly(1,4-butylene terephthalate) from General Electric Company, intrinsic viscosity of 0.66 dl/g as measured in a 60:40 wt. % phenol/tetrachloroethane mixture at 25° C. |
| GE PBT 309 (1.0 iv) | Poly(1,4-butylene terephthalate) from General Electric Company, intrinsic viscosity of 1.0 dl/g as measured in a 60:40 wt. % phenol/tetrachloroethane mixture at 25° C. |
| GE PBT 315 (1.2 iv) | Poly(1,4-butylene terephthalate) from General Electric Company, intrinsic viscosity of 1.2 dl/g as measured in a 60:40 wt. % phenol/tetrachloroethane mixture at 25° C. |
| Ultratalc 609 | Ultrafine ground functional talc-60% $SiO2$; 32% MgO, average particle size less than 0.9 microns, from Stochem Co. |
| TSAN | 50/50 wt % polytetrafluoroethylene blended with poly(styrene-co-acrylonitrile) from General Electric Co. |
| Lotader AX8900 | Random Terpolymer of Ethylene (E), Acrylic Ester (AE) andGlycidyl Methacrylate Ester (GMA) from Arkema |
| GE MBS | Methacrylate-Butadiene-Styrene emulsion copolymer impact modifier with core-shell structure from General Electric Co. |
| Seenox 412S | Thioester, Pentaerythritol tetrakis(3-(dodecylthio)propionate) sold as SEENOX 412-S from Crompton |
| IRGANOX 1010 | Hindered Phenol, Pentaerythritol tetrakis(3,5-di-tert-butyl-4-hydroxyhydrocinnamate) sold as IRAGANOX 1010 from Ciba Geigy |
| IRGAPHOS 168 | Phosphite, 2,4-di-tert-butylphenol phosphite (3:1) sold as IRGAPHOS 168 from Ciba Geigy |
| ERL4221 | 3,4-epoxycyclohexylmethyl-3-4-epoxy-cyclohexyl carboxylate for DOW Chemical |
| NaSt | Sodium Stearate |
| PETS | pentaerythritol tetrastearate |
| Acrylic Impact Modifier | Acrylic impact modifier from Rohm and Haas EXL3330, Emulsion copolymer of methacrylate-butyl acrylate with core-shell structure. |
| PC 100 | PC bisphenol polycarbonate Lexan ® resin from General Electric Company. Mn by GPC againt polystyrene standards is 29 Kg/mol. |
| PC 175 | PC bisphenol polycarbonate Lexan ® resin from General Electric Company. Mn by GPC againt polystyrene standards is 22 Kg/mol. |
| VHRG Resin | MethylMethacrylate Acrylonitrile Butadiene Styrene Copolymer from GE |
| Branched PC Resin | Branched Polycarbonate Lexan ® Resin from General Electric Company. Mn by GPC against polystyrene standards is 37 kg/mol |
| phosphorous acid | 45% solution of phosphorous acid in distilled water |
| UVA 234 | ???????? |

Procedure 1

The ingredients of the examples shown below in the indicated tables were extruded on a 40 mm Werner Pfleiderer Twin Screw Extruder with a vacuum vented mixing screw, at a barrel and die head temperature between 240 and 265 degrees C. and 150 to 300 rpm screw speed. The extruder had 8 independent feeders for different raw materials and can be operated at a maximum rate of 300 lbs/hr (136.4 kgs/hr). The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Procedure 2

The ingredients of the examples shown below in Tables, were extruded on a 37 mm Toshiba TEM-37BS Twin Screw Extruder with a vacuum vented mixing screw, at a barrel and die head temperature between 240 and 265 degrees C. and 150 to 300 rpm screw speed. The extruder has 8 independent feeders for different raw materials and can be operated at a maximum rate of 200 lbs/hr (90.9 kgs/hr). The extrudate was cooled through a water bath prior to pelletizing. Test parts were injection molded on NISSEI ES3000 (for ASTM bars) or FANUC S-2000i (for ISO bars) molding machines with a set temperature of approximately 240 to 265° C. The pellets were dried for 3-4 hours at 120° C. in a forced air circulating oven prior to injection molding.

Procedure 3

The ingredients of the examples shown below in Tables, were extruded on a Second Generation 30 mm co-rotating twin-screw extruder. This extruder is fitted with 9 barrel sections (L/D=29) and 2 feeders for introducing raw materials to the feed throat. Typically the materials were fed to the extruder at a rate between 30 lbs (13.6 kgs) and 60 lbs (27.3 kgs) per hour. The screw speed is typically adjusted to a value between 300 and 500 RPM. To minimize the specific energy and residence time of the material, the exact combination of feed rate and screw speed are selected to produce high feed rate and high torque. Compounded pellets were dried for 3-4 hours at 250° F. (121° C.) in an air-circulating oven prior to molding. A van Dorn injection-molding machine was used with following temperature profile (rear to front): 554 (290° C.), 570 (299° C.), 570 (299° C.), 590° F. (310° C.). Typical settings were as follows: 100 rpm screw speed, 600 psi (421, 800 kg/m²) hold pressure, 75 psi (52,725 kg/m²) back pressure, and 30 sec cycle times. Temperatures at the front of the barrel and hold/back pressures were adjusted to accommodate differences in the processability between formulations. All standard parts were 0.125" (3.12 mm) thick.

Testing Procedure

Melt Volume Rate (MVR) on pellets (dried for 2 hours at 120° C. prior to measurement) was measured according to ISO 1133 method at 250 C and 5 kgf at dwelling time of 240 seconds and a 0.0825 inch (2.1 mm) orifice.

Capillary viscosity, which is another indicator of melt-flow was measured by ASTM D3835 or ISO D11433. Dried pellets were extruded through a capillary Rheometer and the force at varied shear rates was determined to estimate the shear viscosity.

Tensile properties were tested according to ISO 527 on 150×10×4 mm (length×width×thickness) injection molded bars at 23° C. with a crosshead speed of 5 mm/min. Izod unnotched impact was measured at 23° C. with a pendulum of 5.5 Joule on 80×10×4 mm (length×width×thickness) impact bars according to ISO 180 method. Flexural properties or three point bending were measured at 23° C. on 80×10×4 mm (length×width×thickness) impact bars with a crosshead speed of 2 mm/min according to ISO 178.

In other cases, injection molded parts were tested by ASTM. Notched Izod testing as done on 3×½×⅛ inch (76.2× 12.7×3.2 mm) bars using ASTM method D256. Bars were notched prior to oven aging, samples were tested at room temperature. Tensile elongation at break was tested on 7×⅛ in. (177.8×3.3 mm) injection molded bars at room temperature with a crosshead speed of 2 in./min (50.8 mm/min) for glass filled samples and 0.2 in/min (5.08 mm/min) for unfilled samples by using ASTM D648. Flexural properties were measured using ASTM 790 or ISO 178 method. Biaxial impact testing, sometimes referred to as instrumented impact testing, was done as per ASTM D3763 using a 4×⅛ inch (101.6×3.2 mm) molded discs. The total energy absorbed by the sample is reported as ft-lbs or J. Testing was done at room temperature on as molded or oven aged samples. Heat Deflection Temperature was tested on five bars having the dimensions 5×0.5×0.125 inches (127×12.7×3.2 mm) using ASTM method D648.

A synopsis of all the relevant tests and test methods is given in Table 1.

TABLE 1

Test Methods and Descriptions

| | Test Standard | Default Specimen Type | Units |
|---|---|---|---|
| ASTM Flexural Test | ASTM D790 | Bar - 127 × 12.7 × 3.2 mm | Mpa |
| ISO Flexural Test | ISO 178 | Multi-purpose ISO 3167 Type A | Mpa |
| ASTM HDT Test | ASTM D648 | Bar - 127 × 12.7 × 3.2 mm | ° C. |
| ISO HDT Test | ISO 75 | Bar - 80 × 10 × 4 mm | ° C. |
| ASTM HDT Test | ASTM D648 | Bar - 127 × 12.7 × 3.2 mm | ° C. |
| ISO HDT Test | ISO 75 | Multi-purpose ISO 3167 Type A | ° C. |
| ASTM Filled Tensile Test | ASTM D638 | ASTM Type I Tensile bar | Mpa |
| ISO Filled Tensile Test | ISO 527 | Multi-purpose ISO 3167 Type A | Mpa |
| ISO Izod at Room Temperature | ISO 180 | Multi-purpose ISO 3167 Type A | kJ/m² |
| ASTM Izod at Room Temperature | Notched ASTM D256 | Bar - 63.5 × 12.7 × 3.2 mm | J/m |

TABLE 1-continued

| | Test Standard | Default Specimen Type | Units |
|---|---|---|---|
| Test Methods and Descriptions | | | |
| ASTM Multiaxial Impact | ASTM D3763 | Disk - 101.6 mm dia × 3.2 mm thick | J |
| ISO Charpy Impact | ISO 179 | Bar - 80 × 10 × 4 mm | $kJ/m^2$ |
| ISO Density | ISO 1183 | Bar - 80 × 10 × 4 mm | $g/cm^3$ |
| Shrinkage | GEP Method | Disk - 101.6 mm dia × 3.2 mm thick | % |
| ISO Melt Volume Rate Test | ISO 1133 | Pellets | $cm^3/10$ min |
| ASTM Melt Flow Rate | ASTM D1238 | Pellets | g/10 min |
| ISO Vicat Softening Temp | ISO 306 | Bar - 80 × 10 × 4 mm | °C. |
| ISO Coefficient of Thermal Expansion | ISO 11359-2 | Multi-purpose ISO 3167 Type A | m/(m-°C.) |

The examples of Tables below were all extruded and molded according to procedures as shown in Table 2.

TABLE 2

Extrusion Procedures for Different Samples

| Examples | Procedures |
|---|---|
| 1-3 | 1 |
| 4-12 | 2 |
| 13-16 | 1 |
| 21-24 | 3 |

All compositions are listed out in weight %.

Examples 1, 2 and 3

The purpose of these examples was three fold. Firstly, these examples show that useful molding compositions can be made from the PET derived PBT. In fact, the properties of these compositions are comparable to that of virgin PBT derived from dimethyl terephthalate. Secondly, these examples also show that the presence of small quantities of nucleating agents help boost the heat properties of the PET derived PBT compositions. Thirdly, the examples show how a lesser amount of energy was needed to produce PBT from PET, versus DMT based PBT. This energy refers to the non-renewable energy that is utilized in making the raw materials that are used in the molding composition. It involves conducting a "cradle to grave" energy analysis on all components of the system and calculating the total energy required to make them. In all the examples shown in this patent, this difference in energy results only due to the use of PET derived PBT versus DMT based PBT. All other ingredients remain the same and hence their energy contribution in the overall composition can be neglected.

The compositions of examples 1, 2 and 3 are as shown in Table 3.

TABLE 3

'PET derived PBT' Composition with various additives.

| Component | unit | 1 | 2 | 3 (comparative) |
|---|---|---|---|---|
| GE PBT 315 (1.2 iv) | % | | | 37 |
| PET Derived PBT (1.2 iv) | % | 37 | 37 | |
| Ultratalc 609 | % | | 0.50 | |
| PC100 | % | 48 | 48 | 48 |
| GE MBS | % | 14 | 14 | 14 |
| Irganox 1010 | % | 0.20 | 0.20 | 0.20 |
| SEENOX 412S | % | 0.20 | 0.20 | 0.20 |
| Phosphorous acid 45% solution in distilled water | % | 0.05 | 0.05 | 0.05 |

The properties of the molding compositions shown in Table 3 are tabulated below.

TABLE 4

Physical Property Data for Formulations 1, 2 and 3

| Test | Unit | 1 | 2 | 3 (Comparative) |
|---|---|---|---|---|
| Heat Deflection temp, 0.455 MPa (ASTM) | °C. | 100 | 107 | 109 |
| Heat Deflection temp, 0.456 MPa (ISO) | °C. | 100 | 104 | 108 |
| Heat Deflection temp, 1.82 MPa (ASTM) | °C. | 79 | 82 | 83 |
| Heat Deflection temp, Flat, 1.8 MPa (ISO) | °C. | 79 | 82 | 82 |
| Tensile Modulus (ASTM) | MPa | 2040 | 2110 | 2030 |
| Tensile Stress at Yield (ASTM) | MPa | 50.8 | 51.4 | 49.9 |
| Tensile Stress at Break (ASTM) | MPa | 55 | 55 | 53.4 |
| Tensile Elongation at Yield (ASTM) | % | 4.3 | 4.3 | 4.6 |
| Tensile Elongation at Break (ASTM) | % | 153 | 150 | 151 |
| Tensile Modulus (ISO) | MPa | 1975 | 2023 | 1966 |
| Tensile Stress at Yield (ISO) | MPa | 49 | 49 | 48 |
| Tensile Stress at Break (ISO) | MPa | 42 | 46 | 48 |

TABLE 4-continued

Physical Property Data for Formulations 1, 2 and 3

| Test | Unit | 1 | 2 | 3 (Comparative) |
|---|---|---|---|---|
| Tensile Strain at Yield (ISO) | % | 4 | 4 | 4 |
| Tensile Strain at Break (ISO) | % | 140 | 141 | 114 |
| Notched IZOD Impact Strength (ASTM), at −40° C. | J/m | 593 | 493 | 563 |
| Notched IZOD Impact Strength (ASTM), −30° C. | J/m | 644 | 607 | 620 |
| Notched IZOD Impact Strength (ISO), at −40° C. | J/m | 47 | 42 | 46 |
| Notched IZOD Impact Strength (ISO) at −30° C. | J/m | 51 | 47 | 48 |
| Multiaxial Impact Total Energy, 2.3 m/s, at −40° C. (ASTM) | J | 17.3 | 16.7 | 17.4 |
| Multiaxial Impact Total Energy, 2.3 m/s, at −30° C. (ASTM) | J | 17.6 | 17.8 | 17.6 |
| Multiaxial Impact Total Energy, 6.6 m/s, at −40° C. (ASTM) | J | 17.6 | 17.1 | 17.2 |
| Multiaxial Impact Total Energy, 6.6 m/s, at −30° C. (ASTM) | J | 17.3 | 17.3 | 17.3 |
| Multiaxial Impact Total Energy, 4.4 m/s, at −40° C. (ISO) | J | 19.9 | 19.5 | 21.1 |
| Multiaxial Impact Total Energy, 4.4 m/s, at −30° C. (ISO) | J | 20.6 | 18.9 | 19.5 |
| MVR, 250 C., 5 Kg, 240 s (ISO) | cm³/10 min | 11.4 | 10.7 | 11.9 |
| MVR, 250 C., 5 Kg, 360 s (ISO) | cm³/10 min | 11.3 | 10.6 | 11.9 |
| Capillary Viscosity @ 644.50 App shear rate @ 1/s | Pa-s | 666 | 690 | 661 |

The comparison between Example 1 and Example 3 showed that comparable properties of the molding composition can be obtained with the PET derived PBT. The notched izod @−30° C. for both the cases can be considered equal within limits of experimental error. The same is true for the tensile elongation @ break values. The heat deflection temperature (HDT) of the composition with 'PET derived PBT' was 3-9° C. lower than that with virgin PBT. The heat deflection temperature of the PET derived PBT formulation can be increased by addition of ultratalc as shown in example 2. A small quantity of ultratalc with average particle size at less than 0.9 micro-meter substantially increased the HDT of the 'PET derived PBT' composition.

It was observed that Ultratalc, an inorganic filler with large surface area, increased the HDT. Adding 0.5% ultratalc in example 2 did not induce significantly adverse effect on other mechanical properties.

The preparation of both the examples 1 and 2 consumed less energy by approximately 8.9 MJ/kg in comparison to that of the comparative example. Thus, the compositions of Example 1 and Example 2 were more energy efficient molding compositions than the composition of Comparative Example 3.

Examples 4-11 and Comparative Example 12

The objective of these experiments was to evaluate the effect of ULTRATALC™. additive and polytetrafluoroethylene (TSAN) on the heat deflection temperature of 'PET derived PBT' compositions. Also, all the examples using compositions with PET-derived PBT were more energy efficient than the comparative examples that did not use PET-derived PBT.

The compositions of examples 4 through 12 are shown in Table 5.

TABLE 5

'PET derived PBT' Composition with Polytetrafluoroethylene and Ultratalc ™.additive

| Formulation | unit | 4 | 5 | 6 | 7 | 8 | 9 | 10 | 11 | 12 (comparative) |
|---|---|---|---|---|---|---|---|---|---|---|
| GE PBT 315 (1.2 iv) | % | | | | | | | | | 30.15 |
| PET Derived PBT (1.2 iv) | % | 30.15 | 30.03 | 29.95 | 29.80 | 29.65 | 29.95 | 29.65 | 28.65 | |
| PC100 | % | 67.55 | 67.17 | 66.75 | 66.40 | 66.05 | 66.75 | 66.05 | 64.05 | 67.55 |
| Lotader AX8900 | % | 2.00 | 2.00 | 2.00 | 2.00 | 2.00 | 2.00 | 2.00 | 2.00 | 2.00 |
| Ultratalc 609 | % | | | | | 1.00 | 1.00 | 2.00 | 5.00 | |
| TSAN | % | | 0.50 | 1.00 | 1.50 | 1.00 | | | | |
| Irganox 1010 | % | 0.08 | 0.08 | 0.08 | 0.08 | 0.08 | 0.08 | 0.08 | 0.08 | 0.08 |
| Irgafos 168 | % | 0.20 | 0.20 | 0.20 | 0.20 | 0.20 | 0.20 | 0.20 | 0.20 | 0.20 |
| Phosphorous acid, 50% in water | % | 0.02 | 0.02 | 0.02 | 0.02 | 0.02 | 0.02 | 0.02 | 0.02 | 0.02 |

Testing Procedures

The compositions were subjected to testing in accordance to the testing procedures described above. The properties obtained from the small particle size talc based composition are as shown in Table 6.

TABLE 6

Properties of 'PET derived PBT' Composition with Polytetrafluoroethylene and ultratalc.???

| Test | Unit | 4 | 5 | 6 | 7 | 8 | 9 | 10 | 11 | 12 (comparative) |
|---|---|---|---|---|---|---|---|---|---|---|
| Deflection temp, 1.8 MPa (ISO) | °C. | 114 | 116 | 118 | 121 | 120 | 117 | 118 | 121 | 128 |
| Flexural Modulus (ISO) | MPa | 23596 | 24005 | 24172 | 24131 | 23913 | 23978 | 23766 | 24312 | 23456 |
| Flexural Strength (ISO) | MPa | 916 | 933 | 940 | 934 | 914 | 926 | 929 | 919 | 893 |
| Tensile Stress at Break (ISO) | MPa | 594 | 597 | 597 | 596 | 596 | 602 | 598 | 596 | 590 |
| Tensile Elongation at Break (ISO) | % | 292 | 265 | 269 | 220 | 247 | 300 | 317 | 288 | 262 |
| Notched IZOD Impact Strength (ISO) at Room Temperature | kJ/m2 | 83 | 84 | 83.9 | 83.92 | 83.58 | 84 | 81 | 16 | 84 |
| MFI | g/10 min | 9.7 | 8.9 | 9.0 | 7.9 | 8.1 | 8.6 | 8.3 | 7.9 | 7.4 |
| Specific gravity |  | 1.22 | 1.22 | 1.22 | 1.22 | 1.22 | 1.22 | 1.23 | 1.25 | 1.22 |

The comparison between Example 4 and comparative Example 12 shows that heat deflection temperature (HDT) of the composition with 'PET derived PBT' was substantially lower than that with virgin PBT. In examples 9-11, ultratalc substantially increased the HDT of the 'PET derived PBT' composition. Ultratalc, an inorganic filler with large surface area, increased the HDT. Note that adding up to 2% ultratalc did not induce significantly adverse effect on other mechanical properties in the table and that adding 5% ultratalc reduced the ductility of the material as shown in notched izod in the example 11. Surprisingly, polytetrafluoroethylene also increased HDT of 'PET derived PBT' compositions in examples 5-7.

The energy consumption of the examples 4 through 11 was on an average less than that of comparative example 12 by 9.2 MJ/kg.

Examples 13 and Example 14 (Comparative)

The objective of these examples was to illustrate useful molding compositions that could be used to make blow molded articles from the PET derived PBT. Also, the PET derived PBT example is more energy efficient than the comparative, which is derived from DMT based PBT.

The compositions of Example 13 and Example 14 are shown in Table 7.

TABLE 7

PET Derived PBT Composition for Blow Molding Applications

| Item Description | Unit | 13 | 14 (Comparative) |
|---|---|---|---|
| GE PBT 315, 1.2 iv | % |  | 31.29 |
| PET Derived PBT, 1.2 iv | % | 31.29 |  |
| VHRG Resin | % | 15.8 | 15.8 |
| SEENOX 412S | % | 0.3 | 0.3 |
| TSAN | % | 0.7 | 0.7 |
| ERL4221 | % | 0.05 | 0.05 |
| Irganox1010 | % | 0.1 | 0.1 |
| PETS | % | 0.1 | 0.1 |
| PHOSPHITE STABILIZER | % | 0.03 | 0.03 |
| Branched PC Resin | % | 51.63 | 51.63 |
|  |  | 100 | 100 |

Testing Procedures

The compositions were subjected to testing in accordance to the testing procedures described above. The properties obtained from the compositions in examples 13 and 14 are as shown in Table 8.

TABLE 8

Physical Properties of Molding Compositions for Blowmolding Applications made from PET Derived PBT

| Tests | Units | 13 | 14 (Comparative) |
|---|---|---|---|
| Deflection temp, 1.82 MPa (ASTM) | °C. | 80.9 | 87 |
| Deflection temp, Flat, 1.8 MPa (ISO) | °C. | 74.6 | 82 |
| Deflection temp, 0.455 MPa (ASTM) | °C. | 101 | 110 |
| Deflection temp, 0.456 MPa (ISO) | °C. | 96.1 | 108.4 |
| Tensile Modulus (ASTM) | MPa | 2220 | 2210 |
| Tensile Stress at Yield (ASTM) | MPa | 52.2 | 52 |
| Tensile Stress at Break (ASTM) | MPa | 51.2 | 50.7 |
| Tensile Elongation at Yield (ASTM) | % | 4.2 | 4.4 |
| Tensile Elongation at Break (ASTM) | % | 119.8 | 119.1 |
| Tensile Modulus (ISO) | MPa | 2148.2 | 2271.6 |
| Tensile Stress at Yield (ISO) | MPa | 49.78 | 49.94 |
| Tensile Stress at Break (ISO) | MPa | 52.64 | 50.44 |
| Tensile Strain at Yield (ISO) | % | 3.76 | 4.02 |
| Tensile Strain at Break (ISO) | % | 142.8 | 116.5 |
| Notched IZOD Impact Strength (ASTM), −40, 2 LBF/FT | J/m | 516 | 538 |
| Notched IZOD Impact Strength (ASTM), −30, 2 LBF/FT | J/m | 549 | 548 |
| MVR, 250 C., 5 Kg, 360 s (ASTM) | $cm^3$/10 min | 5.11 | 4.93 |
| App. Viscosity @ 644.50 App shear rate @ 1/s; 250 C. | Pa-s | 696.3 | 724.4 |

The above data proved that useful molding compositions were made from PET derived PBT. The molding composition shown above is of great utility in blow molding applications where a large hang time is needed. The hang time is enhanced due to the presence of SAN encapsulated PTFE in the molding composition. This molding composition is useful in making large parts for automotive and industrial applications such as step pads, which are difficult to make via conventional injection molding process.

The energy required to make the composition of Example 13 was less than that of the composition of Example 14 (Comparative) by approximately 9.4 MJ/kg.

Example 15 and Example 16 (Comparative)

The objective of these examples was to illustrate that useful molding compositions that can be used to make weatherable, impact modified articles could be made from the PET derived PBT. Also, the PET derived PBT molding composition was more energy efficient than its equivalent DMT based PBT formulation.

The compositions of Examples 15 and 16 are shown in Table 9.

TABLE 9

| Item Description | Unit | 15 | 16 Comparative |
|---|---|---|---|
| PC100 | % | 20.29 | 20.29 |
| GE PBT 315, 1.2 iv | % |  | 28.6579 |
| PET Derived PBT, 1.2 iv | % | 28.6579 |  |
| PC 175 | % | 34.6321 | 34.6321 |
| SEENOX 412S | % | 0.4 | 0.4 |
| Irganox1010 | % | 0.08 | 0.08 |
| PHOSPHOROUS ACID 45% in water | % | 0.05 | 0.05 |
| ERL4221 | % | 0.05 | 0.05 |
| PHOSPHITE STABILIZER | % | 0.3 | 0.3 |
| UVA 234 | % | 0.54 | 0.54 |
| PC 80%/LOTADER AX8900 20% CONCENTRATE | % | 15 | 15 |
|  |  | 100 | 100 |

Testing Procedures

The compositions were subjected to testing in accordance to the testing procedures described above. The properties obtained from the compositions 15 and 16 are as shown in Table 10.

TABLE 10

Physical Properties of Impact Modified, Weatherable Molding Composition Containing PET Derived PBT

| Physical Property Test | Unit | 15 | 16 (Comparative) |
|---|---|---|---|
| Deflection temp, 1.82 MPa (ASTM) | ° C. | 82 | 86.5 |
| Deflection temp, Flat, 1.8 MPa (ISO) | ° C. | 79.15 | 82 |
| Deflection temp, 0.455 MPa (ASTM) | ° C. | 95.9 | 104 |
| Deflection temp, 0.456 MPa (ISO) | ° C. | 92.55 | 102.1 |
| Tensile Modulus (ASTM) | MPa | 2420 | 2400 |
| Tensile Stress at Yield (ASTM) | MPa | 62.1 | 59.1 |
| Tensile Stress at Break (ASTM) | MPa | 43.6 | 58.9 |
| Tensile Elongation at Yield (ASTM) | % | 4.4 | 4.5 |
| Tensile Elongation at Break (ASTM) | % | 18.6 | 127.5 |
| Tensile Modulus (ISO) | MPa | 2465.8 | 2556.2 |

TABLE 10-continued

Physical Properties of Impact Modified, Weatherable Molding Composition Containing PET Derived PBT

| Physical Property Test | Unit | 15 | 16 (Comparative) |
|---|---|---|---|
| Tensile Stress at Yield (ISO) | MPa | 59.72 | 59.92 |
| Tensile Stress at Break (ISO) | MPa | 52.6 | 57.84 |
| Tensile Strain at Yield (ISO) | % | 3.96 | 4.18 |
| Tensile Strain at Break (ISO) | % | 122.42 | 128.52 |
| Notched IZOD Impact Strength (ASTM), −40, 2 LBF/FT | J/m | 94.5 | 97.5 |
| Notched IZOD Impact Strength (ASTM), −30, 2 LBF/FT | J/m | 89.5 | 98.7 |
| MVR, 250 C., 5 Kg, 360 s (ASTM) | $cm^3$/10 min | 13.8 | 12.2 |
| App. Viscosity @ 644.50 App shear rate @ 1/s; 250 C. | Pa-s | 755.3 | 787.9 |

It was observed from Table 10 that a molding composition with useful properties was made by the use of PET derived PBT. The molding composition displayed superior impact resistance at low temperatures, as observed by the high notched izod values. Further, the PET derived PBT molding composition displays better energy efficiency than the DMT based PBT composition. The energy required to make the PET derived PBT composition was less than the DMT based PBT by 8.7 MJ/kg. Thus, the composition based on the PET derived PBT was more energy efficient as compared with the DMT-derived PBT composition.

Examples 17-24

The purpose of these experiments was to produce a PET derived PBT copolymer with different amounts of comonomer loadings. It is known that the materials having a melting point greater than 200° C. exhibit useful engineering thermoplastic type properties. Thus, all the examples below show that useful PET derived PBT copolymers (melting point greater than 200° C.) can be synthesized. The process to produce these materials is shown below. Examples 18-20 used the recipes as indicated in Table 11.

TABLE 11

Raw material amount details used for Examples 18-20 (PET derived PBT)

| Item | Parameter | Unit | 18 | 19 | 20 |
|---|---|---|---|---|---|
| Raws | Polyester Type |  | Recycled PET | Recycled PET | Recycled PET |
|  | PET Weight | Kgs | 11.4 | 11.6 | 11.6 |
|  | BDO Weight | Kgs | 10.7 | 16.8 | 16.8 |
|  | IPA Weight | Kgs | 0.0 | 0.52 | 1.04 |
|  | TPT as Ti Element | Ppm | 59 | 52.5 | 50.1 |

Pilot plant process (BDO:PET=2.9:1)

A modified polybutylene random copolymer was derived from a polyethylene terephthalate component at larger scale in a helicone reactor. The helicone reactor had a capacity of 40 liters and was equipped with a special design of twin opposing helical blades with 270 degree twist; constructed of 316

SS with 16 g polish finish. The blade speed could be varied from 1 to 65 rpm. The agitators were connected to a 7.5 HP Constant Torque Inverter Duty Motor which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

25 lbs (11.4 kgs) of recycle PET pellets with 35 lbs (15.9 kgs) of butanediol (molar ratio 2.9:1) were charged to the helicone reactor. 4.6 ml (100 ppm as Ti) of TPT catalyst were also added to the reaction mix. The temperature of the heating oil (for the helicone) was set to 250 C. The agitator speed was set at 67% of maximum. The butanediol was refluxed into the reactor for 2 hours. It should be noted that the design of the overhead condenser system did not allow a complete reflux of the butanediol. As a result, about 5 lbs (2.3 kgs) to 10 lbs (4.5 kgs) of butanediol evolved in the initial stages could not be refluxed. The butanediol evolved after that could be completely refluxed into the reactor.

For the polymerization stage (also referred to in this draft as 'poly stage'), a vacuum was applied to the helicone reactor and the reflux of butanediol to the reactor was discontinued. The speed of the agitator was set to 60% of max and the target amps of the motor were 3.5 amps. The logic for changes in agitator speed as the molecular weight of the polymer built up is shown in Table 3. The system pressure was brought down to 0.5 Torr (0.066 kPa) by the vacuum blower. The reaction was carried out until the polymer mass reached its $3^{rd}$ build. The reaction was stopped after 15 minutes into the $3^{rd}$ build and the polymer was cast in blobs. The products were then allowed to dry and ground into pellets. The following tests were conducted on the polymer sample: iv measurement, NMR analysis and DSC analysis.

TABLE 12

Differential scanning calorimetry (DSC), Intrinsic viscosity (IV) and composition data by NMR of the Examples 18, 19, 20 and Comparative Example 17

| Item | Parameter | Unit | Example 17 Comparative (Commercial GE PBT 309) | Example 18 | Example 19 | Example 20 |
|---|---|---|---|---|---|---|
| DSC Data | Melting Point | (° C.) | 229.0 | 204.53 | 210.93 | 203.09 |
|  | Crystallization Temp | (° C.) | 167.34 | 158.76 | 149.91 | 139.68 |
|  | DH fusion | (° C.) | 37.97 | 27.08 | 24.79 | 23.65 |
|  | DH crystallization | (kJ/kg) | 49.19 | 33.38 | 38.73 | 33.36 |
| Intrinsic Viscosity | IV | dl/g | 1.0 | 1.1 | 1.1 | 1.2 |
| Composition by NMR analysis | EG Repeat Unit | mol % | 0 | 5.3 | 2.8 | 2.9 |
|  | DEG Repeat Unit | mol % | 0 | 0.5 | .2 | .2 |
|  | BDO Repeat Unit | mol % | 50 | 44.2 | 47.5 | 47.4 |
|  | Isophthalic Repeat Unit | mol % | 0 | 1.2 | 3.4 | 5.5 |
|  | Terephthalic Repeat Unit | mol % | 50 | 48.9 | 46.2 | 44.1 |
|  | Total Comonomers | mol % | 0 | 7.0 | 6.4 | 8.6 |
|  | Total Comonomer Equivalents | ** | 0 | 14 | 12.8 | 17.2 |

** Equivalents relative to the total of 100 equivalents of diol and 100 equivalents of diacid groups Examples 22, 23, and 24 were synthesized using resins from Examples 18, 19, and respectively. The formulation for Examples 22-24 is shown below in Table 13.

TABLE 13

Formulations for Examples 22, 23, 24, and Comparative Example 21

| Component | Unit | Example 21 Comparative (Commercial GE PBT 309) | Example 22 | Example 23 | Example 24 |
|---|---|---|---|---|---|
| GE PBT 309 (1.0iv) | % | 37.3 |  |  |  |
| PET Derived PBT | % |  | 37.3 | 37.3 | 37.3 |
| PC100 | % | 47.05 | 47.05 | 47.05 | 47.05 |
| SEENOX 412S | % | 0.20 | 0.20 | 0.20 | 0.20 |
| Phosphorous acid 45% solution in distilled water | % | 0.05 | 0.05 | 0.05 | 0.05 |
| Irganox 1010 | % | 0.20 | 0.20 | 0.20 | 0.20 |
| GE MBS | % | 15.20 | 15.20 | 15.20 | 15.20 |

The properties of molding compositions shown in Table 13 are tabulated below in Table 14.

has minimal impact on tensile modulus of the molding compositions.

TABLE 14

Physical Property data for Examples 22, 23, 24, and Comparative Example 21

| Test | Unit | Example 21 Comparative (Commercial GE PBT 309) | Example 22 | Example 23 | Example 24 |
|---|---|---|---|---|---|
| Heat Deflection temp, 0.455 Mpa (ASTM) | °C. | 101.9 | 101.5 | 95.3 | 82.9 |
| Heat Deflection temp, 1.82 MPa (ASTM) | °C. | 73.7 | 67.7 | 68.2 | 61.2 |
| Tensile Modulus (ASTM) | MPa | 1830 | 1810 | 1850 | 1840 |
| Tensile Stress at Yield (ASTM) | MPa | 47.3 | 47.9 | 48.7 | 48.6 |
| Tensile Stress at Break (ASTM) | MPa | 42.8 | 40.8 | 42.9 | 37.5 |
| Tensile Elongation at Yield (ASTM) | % | 4.4 | 4.2 | 4.2 | 3.9 |
| Tensile Elongation at Break (ASTM) | % | 162.0 | 129.9 | 146.2 | 114.3 |
| Notched IZOD Impact Strength (ASTM), at 23° C. | J/m | 696 | 773 | 764 | 742 |
| Flex Modulus (ASTM) | MPa | 2010 | 1980 | 2030 | 2050 |
| Flex Stress @ 5% Strain (ASTM) | MPa | 71.2 | 70.3 | 72.1 | 69.4 |
| Flex Stress @ Yield (ASTM) | Mpa | 72.1 | 70.9 | 72.7 | 69.5 |
| MVR, 250 C., 5 Kg, 360 s (ASTM) | $cm^3$/10 min | 21.6 | 12.2 | 10.2 | 17.3 |
| EG Repeat Unit | mol % | 0 | 5.3 | 2.8 | 2.9 |
| DEG Repeat Unit | mol % | 0 | 0.5 | .2 | .2 |
| BDO Repeat Unit | mol % | 50 | 44.2 | 47.5 | 47.4 |
| Isophthalic Repeat Unit | mol % | 0 | 1.2 | 3.4 | 5.5 |
| Terephthalic Repeat Unit | mol % | 50 | 48.9 | 46.2 | 44.1 |
| Total Comonomers (calculated on basis of 50 moles of diol groups and 50 moles of diacid/diester groups) | mol % | 0 | 7.0 | 6.4 | 8.6 |
| Total Comonomer Equivalents relative to the total of 100 equivalents of diol and 100 equivalents of diacid groups | | 0 | 14.0 | 12.8 | 17.2 |

It is known for commercial reasons, molding compositions having HDT (at 0.455 MPa) greater than 80° C. are useful. A molding composition as shown in Example 24 was made using PET derived PBT having 17.2 equivalents of a residue selected from the group of isophthalic acid groups, ethylene glycol groups, and diethylene glycol groups, and combinations thereof, relative to the total of 100 equivalents of diol and 100 equivalents of diacid groups in the modified polybutylene terepthalate random copolymer). The HDT (at 0.455 MPa) value for this composition was observed to be 82.9° C. It is also interesting to note that the tensile modulus for all examples shown in Table 14 have approximately the same value. This proves that having a higher comonomer content in the PET derived PBT of embodiments used in this invention Example 25

Synthesis of Butanediol from Corn Based Succinic Acid

The purpose of this example is to show that BDO can be derived from biomass.

Techniques/Procedures

Bio-succinic acid for was sourced from Diversified Natural Products.BDO from bio Succinic acid was synthesized in a two-step process as below:

Step (1): Esterification of Succinic Acid to Diethyl Ester:

In a 2.0 litre RB flask on an oil bath with overhead stirrer and condenser arrangement, 200 grams (1.69 m) of bio Succinic acid, 1.0 litre of dry Ethyl alcohol and 5-8 drops of conc $H_2SO_4$ were charged and heated to reflux for 8 hrs. After 8 hrs the alcohol was distilled off, 500 ml dichloromethane was added, and washed with 450 ml of 10% sodium carbonate solution to get distinctly alkaline pH. The organic layer was washed with water and then dried over anhydrous sodium sulfate. The solvent was removed and the diester product was distilled off under vacuum. The pure diester was collected at 140-145° C. at ~20 mm Hg pressure.

Wt of diester: 285 grams
Purity: >99.0% (GC)
Yield: 95%

Step (2): Reduction of diester to BDO:

60 grams (2.6 moles) of clean sodium was placed in a 3 litre RB flask fitted with condenser, overhead stirrer, thermo well and an addition funnel. A mild nitrogen flow was maintained to the flask to keep an inert atmosphere. The nitrogen blanket was removed and a solution of 35 grams (0.2 moles) of diethyl succinate in 700 ml dry ethyl alcohol was added from the dropping funnel, as rapidly as possible keeping the reaction under control. If necessary, external cooling may be applied to keep the reaction under control. The reaction mass was then heated to 120-130° C. for 90 minutes till all the sodium dissolved. Then the reaction mass was cooled to room temp and 25 ml of water was cautiously added. The reaction mixture was refluxed for another 30 minutes to get the unreacted ester hydrolyzed (if any) and then 270 ml conc. hydrochloric acid was added to the cold mixture. The precipitated sodium chloride was filtered off and the filtrate was treated with 300 gram anhydrous potassium carbonate to free it from water. The alcoholic solution was filtered off and the solids were washed with hot alcohol (2×100 ml), the alcohol was removed by distillation. Dry acetone (200-250 ml) was added to the residue, the solids were filtered off and then the acetone was distilled to get the crude BDO. The crude BDO was further distilled under vacuum to get pure fraction at 135-138° C. (20 mm Hg pressure). The weight of BDO obtained in this experiment was 8 gms and the yield was measured to be 45% on the basis of the amount of ester charged.

The biomass derived BDO in this Example can be used in lieu of the BDO used in the process described above.

Example 26

Synthesis of PBT from Recycle PET and BDO from Bio Based Succinic Acid

The purpose of this example was to show that PBT copolymers can be made from biomass-derived BDO.

PET (recycle) 3.5 g (18.23 mmol), ethylene glycol 1.69 g (27.26 mmol) were added to a reactor, and heated to 180° C. under nitrogen atmosphere. At 180° C., the catalyst tetraisopropylorthotitanate (TPT) 200 ppm was added and heating was continued to 225-230° C. and kept for 90 minutes. 5.6 g (62.22 mmol) of 1,4 butanediol (BDO) derived from bio Succinic acid was added to the reaction mass and continued the reaction for another 15 minutes with distilling off ethylene glycol and butane diol from the reaction. Vacuum was applied in a stepwise manner starting from 700 mbar to 500, 300, 100, 75, 50, 25, 10, 5.5, 1.5 and finally to less than 1.0 mbar. The molten reaction mass kept at 0.7 to 0.5 mbar for 30 minutes and finally the polymer was drained off the reactor under nitrogen pressure.

The polyester we obtained had an IV of 0.7 dL/g, melting temperature (Tm) 215° C. The polyester had a weight average molecular weight of 57517 and a number average molecular weight of 13969 (Mw/Mn=4.12). The $^1$H NMR of the polyester showed 96.4 mol % butanediol incorporation and 3.6 mol % of residual ethylene glycol incorporation.

In all the examples above where PBT was derived from PET, the process for making the modified polybutylene terephthalate random copolymers exhibited a reduced $CO_2$ emissions index that was more than one, (1) (more than 1 kg of CO2 was reduced for every kg of modified PBT copolymer that was made). The Example 26 of PBT made from PET and bio-based BDO illustrates that the CO2 impact can be further reduced by using monomer derived from biomass. The PBT made from Recycle PET and BDO based on succinic acid can be used to make any of the molding compositions described above.

Although the present invention has been described in detail with reference to certain preferred versions thereof, other variations are possible. Therefore, the spirit and scope of the appended claims should not be limited to the description of the versions contained therein.

What is claimed is:

1. A molding composition comprising:
   (a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component, and
   (b) from 5 to 90 wt. % of a polycarbonate component; and
   (c) from at least 1 wt. % of an impact modifier component, wherein the modified polybutylene terephthalate random copolymer, the polycarbonate component, the impact modifier, and optionally at least one additive, have a combined weight % of 100 wt %;
   wherein the modified polybutylene terephthalate random copolymer has an ethylene glycol content of from 0.02 to 2 wt %, a diethylene glycol content of from 0.04 to 4 wt %, and a total amount of isophthalic acid groups, ethylene glycol groups, and diethylene glycol groups ranging from 3 to less than or equal to 23 equivalents relative to the total of 100 equivalents of diol and 100 equivalents of diacid groups in the modified polybutylene terephthalate random copolymer.

2. The composition of matter of claim 1, wherein the residue derived from the polyethylene terephthalate component further comprises a compound selected from the group consisting of isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline earth metal salts, alkali salts, phosphorous-containing compounds and anions, sulfur-containing compounds and anions, naphthalene dicarboxylic acids, 1,3-propane diol groups, and combinations thereof.

3. The composition of matter of claim 1, wherein the modified polybutylene terephthalate random copolymer has an ethylene glycol content that is more than 0.85 wt. %.

4. The composition of matter of claim 1, wherein the residues derived from the polyethylene terephthalate component further comprises isophthalic acid groups.

5. The composition of matter of claim 1, wherein the residue derived from the polyethylene terephthalate component is selected from the group consisting of a cis isomer of 1,-3-cyclohexane-dimethanol, a cis isomer of 1,-4-cyclohexane dimethanol, a trans isomer of 1,3-cyclohexane-dimethanol, a trans isomer of 1,4-cyclohexane-dimethanol and combinations thereof.

6. The composition of matter of claim 1, wherein the residue derived from the polyethylene terephthalate component further comprises a compound selected from the group consisting of isophthalic acid groups, a cis isomer of cyclohexane-dimethanol, a trans isomer of cyclohexane dimethanol, and combinations thereof.

7. The composition of matter of claim 1, wherein the at least one residue derived from the polyethylene terephthalate component comprises a mixtures of ethylene glycol, diethylene glycol, and cobalt-containing compounds.

8. The composition of matter of claim 7, wherein the at least one residue derived from the polyethylene terephthalate component further comprises an isophthalic acid groups.

9. The composition of matter of claim 1, wherein the residue derived from the polyethylene terephthalate component is selected from the group consisting of ethylene glycol groups, diethylene glycol groups, and cyclohexanedimethanol groups and is in an amount ranging from 0.1 to 10 mole %, based on 100 mole % of glycol in the molding composition.

10. The composition of matter of claim 9, wherein the residue derived from the polyethylene terephthalate component further comprises isophthalic acid groups in an amount ranging up to 10 mole %, based on 100 mole % of acid in the molding composition.

11. The composition of matter of claim 1, wherein the composition further comprises an additive selected from the group consisting of flame retardants, stabilizers, quenchers, mold release agents, polytetrafluoroethylene, polytetrafluoroethylene-poly(styrene-co-acrylonitrile) mixtures, and combinations thereof.

12. The composition of matter of claim 1, wherein the composition further comprises an additive selected from the group consisting of stearic acid, acetic acid, adipic acid, benzoic acid, metal salts of the foregoing, antimony oxide, talcs, and combinations thereof.

13. The composition of matter of claim 1, wherein the composition from which the article is derived from has a $CO_2$ reduction index that is at least 0.06 kg.

14. The molding composition of claim 1, wherein the polycarbonate component is in an amount ranging from 20 to 70 wt. %.

15. The molding composition of claim 1, wherein the modified polybutylene terephthalate random copolymer is present in an amount ranging from to 10 to 50 wt. %.

16. The composition of claim 1, wherein the composition further comprises a quencher component that is selected from the group consisting of phosphoric acid, zinc phosphate, monozinc phosphate, calcium phosphate, phosphorous acid, and combinations thereof.

17. The composition of claim 16, wherein the composition comprises a quencher component in an amount ranging from 1 to 5000 ppm.

18. The composition of claim 1, wherein the impact modifier is selected from the group consisting of methacrylate butadiene styrene rubbers, acrylate rubbers, acrylonitrile-styrene-acrylate rubbers, high rubber graft acrylonitrile-butadiene-styrenes, acrylate-olefin copolymers, polyolefin modifiers, silicone-acrylic modifiers, and combinations thereof.

19. The composition of claim 1, wherein the composition further comprises a second polyester component that is different from the polyester component containing the modified polybutylene terephthalate random copolymer derived from the polyethylene terephthalate component.

20. A composition of matter comprising an article molded from the composition of claim 1.

21. The composition of claim 1, wherein the modified polybutylene terephthalate random copolymer is derived from a 1,4-butanediol that is derived from biomass.

22. The composition of claim 21, wherein the composition has a $CO_2$ reduction index that is at least 0.06 kg.

23. A molding composition comprising:
(a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) has at least one residue derived from the polyethylene terephthalate component selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane-dimethanol isomers, 1,4-cyclohexanedimethanol isomers, alkaline earth metal salts, alkali salts, including calcium, magnesium, sodium and potassium salts, phosphorous-containing compounds and anions, sulfur-containing compounds and anions, naphthalene dicarboxylic acids, 1,3-propane diol groups, and combinations thereof,
wherein the modified polybutylene terephthalate random copolymer has an ethylene glycol content of from 0.02 to 2 wt %, a diethylene glycol content of from 0.04 to 4 wt %, and a total amount of isophthalic acid groups, ethylene glycol groups, and diethylene glycol groups ranging from 3 to less than or equal to 23 equivalents relative to the total of 100 equivalents of diol and 100 equivalents of diacid groups in the modified polybutylene terephthalate random copolymer;
(b) from 5 to 90 wt. % of a polycarbonate component; and
(c) from at least 1 wt. % of an impact modifier component, wherein the modified polybutylene terephthalate random copolymer, the polycarbonate component, the impact modifier, and optionally at least one additive, have a combined weight % of 100 wt %,
wherein the modified polybutylene terephthalate random copolymer contains the following groups:

wherein R' is an terephthalic acid group (1,4-$C_6H_4$—), R" is an isophthalic acid group (1,3-$C_6H_4$—), D is a butanediol group (—$C_4H_8$—), and D' is an ethylene glycol group (—$C_2H_4$—); such that the polymeric backbone contains isophthalic acid ranging from 1 to 10 mole % and ethylene glycol in an amount from 2 to 10 mole %.

24. The composition of matter of claim 23, wherein the modified polybutylene terephthalate random copolymer is derived from 1,4-butanediol that is derived from biomass.

25. The composition of matter of claim 23, wherein the composition from which the article is derived from has a $CO_2$ reduction index that is at least 0.06 kg.

26. The composition of claim 1, wherein the composition further comprises a material capable of increasing the heat deflection temperature of the composition by at least from 1 to 10° C.

27. The composition of claim 26, wherein the material is selected from the group consisting of talcs having fine particles, nanoparticles, polytetrafluoroethylene, polytetrafluoroethylene blends with other polymers, clays, mica, and combinations thereof.

28. The composition of claim 1, wherein the composition has a melt volume rate that is at least 10% higher as compared to a composition made with a polybutylene terephthalate homopolymer, as measured on pellets according to ISO 1133 method at 250° C. and 5 kgf at dwelling time of 240 seconds and a 2.1 mm orifice.

29. The composition of claim 28, wherein the melt volume rate is from 10% to 80% higher, as compared to a composition made with monomer-derived polybutylene terephthalate instead of the modified polybutylene terephthalate random copolymer, as measured on pellets according to ISO 1133 method at 250° C. and 5 kgf at dwelling time of 240 seconds and a 2.1 mm orifice.

30. The composition of claim 1, wherein the composition has a heat deflection temperature that is at least 80° C., as determined by ASTM D648 at 0.455 MPa.

31. The composition of claim 30, wherein the composition has a total monomer content selected from the group consisting of ethylene glycol, isophthalic acid groups, and diethylene glycol groups in an amount ranging up to 17 equivalents or less of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer.

32. The composition of claim 30, wherein the composition has a total monomer content selected from the group consisting of ethylene glycol, isophthalic acid groups, and diethylene glycol groups in an amount ranging from 10 to less than or equal to 23 equivalents or less of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer.

33. A method of forming a composition comprising melt blending the components of the composition of claim 1.

34. The method of claim 32, further comprising shaping, extruding, or molding the melt blended composition.

35. A method of forming a composition comprising thermoforming the components of the composition of claim 1.

36. The method of claim 34, further comprising molding the melt blended composition.

37. An article comprising the composition of claim 32.

38. A thermoformed article comprising the composition of claim 35.

39. A composition comprising:
(a) from 5 to 90 wt. % of a modified polybutylene terephthalate random copolymer that (1) is derived from polyethylene terephthalate component selected from the group consisting of polyethylene terephthalate and polyethylene terephthalate copolymers and (2) residues derived from the polyethylene terephthalate component, selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline earth metal salts, alkali salts, phosphorous-containing compounds and anions, sulfur-containing compounds and anions, naphthalene dicarboxylic acids, 1,3-propane diol groups, and combinations thereof,
wherein the modified polybutylene terephthalate random copolymer has an ethylene glycol content that is from 0.02 to 2 wt. %, a diethylene glycol content of from 0.04 to 4 wt. %,
wherein the total monomer content selected from the group consisting of ethylene glycol, isophthalic acid groups, and diethylene glycol groups is in an amount ranging from 3 to 17 equivalents or less of a residue selected from the group of isophthalic acid groups, ethylene glycol groups, and diethylene glycol groups, and combinations thereof, relative to the total of 100 equivalents of diol and 100 equivalents of diacid groups in the modified polybutylene terephthalate random copolymer;
(b) from 5 to 90 wt. % of a polycarbonate component;
(c) from 1 wt. % of an impact modifier component;
(d) a quencher component in an amount ranging from 0 to 5000 ppm;
(e) a flame retarding component in an amount ranging from 0 to 25 wt %; and
(f) from 0 to 25 wt % or a carboxy reactive component,
wherein the modified polybutylene terephthalate random copolymer, the polycarbonate component, the impact modifier, and optionally at least one additive, have a combined weight % of 100 wt %; and
wherein the composition has a melt volume rate that is at least 10% higher as compared to a composition made with a polybutylene terephthalate homopolymer, as measured on pellets according to ISO 1133 method at 250° C. and 5 kgf at dwelling time of 240 seconds and a 2.1 mm orifice.

40. A molding composition comprising:
(a) from 5 to 90 wt. % of a modified polybutylene terephthalate random copolymer, and
(b) from 5 to 90 wt. % of a polycarbonate component; and
(c) from at least 1 wt. % of an impact modifier component,
wherein the modified polybutylene terephthalate random copolymer, the polycarbonate component, the impact modifier, and optionally at least one additive, have a combined weight % of 100 wt %, wherein the impact modifier is selected from the group consisting of methacrylate butadiene styrene rubbers, acrylate rubbers, acrylonitrile-styrene-acrylate rubbers, high rubber graft acrylonitrile-butadiene-styrenes, acrylate-olefin copolymers, polyolefin modifiers, silicone-acrylic modifiers, and combinations thereof;
and wherein the polybutylene terephthalate is derived by a process of:
(a) depolymerizing a polyethylene terephthalate component into a first molten mixture by reacting the polyethylene terephthalate component with a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere;

(b) transesterifying by adding 1,4-butanediol to the first molten mixture in a reactor in the presence of a catalyst component at a temperature ranging from 190° C. to 240° C., under conditions that are sufficient to form a second molten mixture; and (c) polymerizing by increasing the temperature of the second molten mixture under subatmospheric conditions and agitation to a temperature from 240° C. to 260° C., thereby forming the modified random polybutylene terephthalate copolymer.

41. The composition of claim 40 wherein the 1,4-butanediol is derived from biomass.

42. A molding composition comprising:
(a) from 5 to 90 wt. % of a modified polybutylene terephthalate random copolymer, and
(b) from 5 to 90 wt. % of a polycarbonate component; and
(c) from at least 1 wt. % of an impact modifier component, wherein the modified polybutylene terephthalate random copolymer, the polycarbonate component, the impact modifier, and optionally at least one additive, have a combined weight % of 100 wt %, and wherein the impact modifier is selected from the group consisting of methacrylate butadiene styrene rubbers, acrylate rubbers, acrylonitrile-styrene-acrylate rubbers, high rubber graft acrylonitrile-butadiene-styrenes, acrylate-olefin copolymers, polyolefin modifiers, silicone-acrylic modifiers, and combinations thereof;

and wherein the modified polybutylene terephthalate is derived from a process of:
(a) converting biomass to 1,4-butanediol;
(b) depolymerizing a polyethylene terephthalate component with the 1,4-butanediol or transesterifying a polyethylene terephthalate component with the 1,4-butanediol after depolymerizing with a diol selected from the group consisting of ethylene glycol, propylene glycol, and combinations thereof.

* * * * *